US011645935B1

(12) United States Patent
Smetters

(10) Patent No.: US 11,645,935 B1
(45) Date of Patent: May 9, 2023

(54) SYSTEMS AND METHODS FOR ASSESSING DATA COLLECTED BY AUTOMATED PROCTORING

(71) Applicant: Respondus, Inc., Redmond, WA (US)

(72) Inventor: David Smetters, Redmond, WA (US)

(73) Assignee: Respondus, Inc., Redmond, WA (US)

( * ) Notice: Subject to any disclaimer, the term of this patent is extended or adjusted under 35 U.S.C. 154(b) by 778 days.

(21) Appl. No.: 16/512,116

(22) Filed: Jul. 15, 2019

Related U.S. Application Data

(60) Provisional application No. 62/698,861, filed on Jul. 16, 2018.

(51) Int. Cl.
 G09B 7/00 (2006.01)
 G06V 20/40 (2022.01)
 G06V 40/16 (2022.01)

(52) U.S. Cl.
 CPC .............. *G09B 7/00* (2013.01); *G06V 20/41* (2022.01); *G06V 40/161* (2022.01); *G06V 20/44* (2022.01)

(58) Field of Classification Search
 CPC ........ G09B 7/00; G06V 40/161; G06V 20/41; G06V 20/44
 See application file for complete search history.

(56) References Cited

U.S. PATENT DOCUMENTS

| 8,602,794 | B2* | 12/2013 | Cohen | ...................... | G09B 7/06 434/350 |
| 2011/0279228 | A1* | 11/2011 | Kumar | ...................... | G09B 7/00 340/5.83 |
| 2014/0272910 | A1* | 9/2014 | del Ninno | ................ | G09B 7/06 434/362 |
| 2015/0325138 | A1* | 11/2015 | Selinger | ................ | G09B 19/00 434/322 |

OTHER PUBLICATIONS

Letter regarding Respondus Patent Application for Review Priority™ Technology, Apr. 28, 2020, 5 pages.

(Continued)

*Primary Examiner* — Timothy A Musselman
(74) *Attorney, Agent, or Firm* — Seed IP Law Group, LLP

(57) ABSTRACT

Systems and methods for processing and analyzing data collected in connection with online examinations are described herein. The methods may be implemented by one or more computing devices and may include flagging one or more proctoring events indicated by data that was obtained in connection with an exam session of a test taker, the one or more flagged proctoring events being potentially associated with one or more exam rule violations. A point value may be assigned to each of the one or more flagged proctoring events. The point value of at least one of the one or more flagged proctoring events may be adjusted with a weight, the weight being obtained based on data other than mere occurrence of the one or more flagged proctoring events. An overall risk level may be generated based on an overall score obtained by tallying together the adjusted point value or values and unadjusted point value or values, if there are any, of all of the one or more flagged proctoring events, the overall risk level indicating likelihood of exam rule violation in connection with the exam session.

22 Claims, 11 Drawing Sheets

(56) References Cited

OTHER PUBLICATIONS

"Respondus Monitor—Respondus," retrieved on Jul. 14, 2020 from https://web.respondus.com/he/monitor/, 5 pages.

"SXSWedu 2014—Proctor.io Demo," indicated to have been posted to YouTube March 2, 2014, https://www.youtube.com/watch?v=OklWs0CPRRo&feature=youtu.be&t=77.

"Canvas Gradebook Access Faculty Guide," indicated to have been posted to YouTube Feb. 15, 2016 https://www.youtube.com/watch?v=4MOZYxfYYhk&feature=youtu.be.

"Proctorio Quick Start Guide," retrieved on Jul. 14, 2020, from http://cvc.edu/wpcontent/uploads/2016/08/ProctorioGuidebook_Final.pdf, 8 pages.

"Using Proctorio in Canvas Tutorial (for Faculty)," indicated to have been posted to YouTube Aug. 17, 2018, https://www.youtube.com/watch?v=LuXKkM7Ne30.

"SXSWedu 2014—Proctor.io Demo," indicated to have been posted to YouTube Mar. 2, 2014, https://www.youtube.com/watch?v=OklWs0CPRRo.

\* cited by examiner

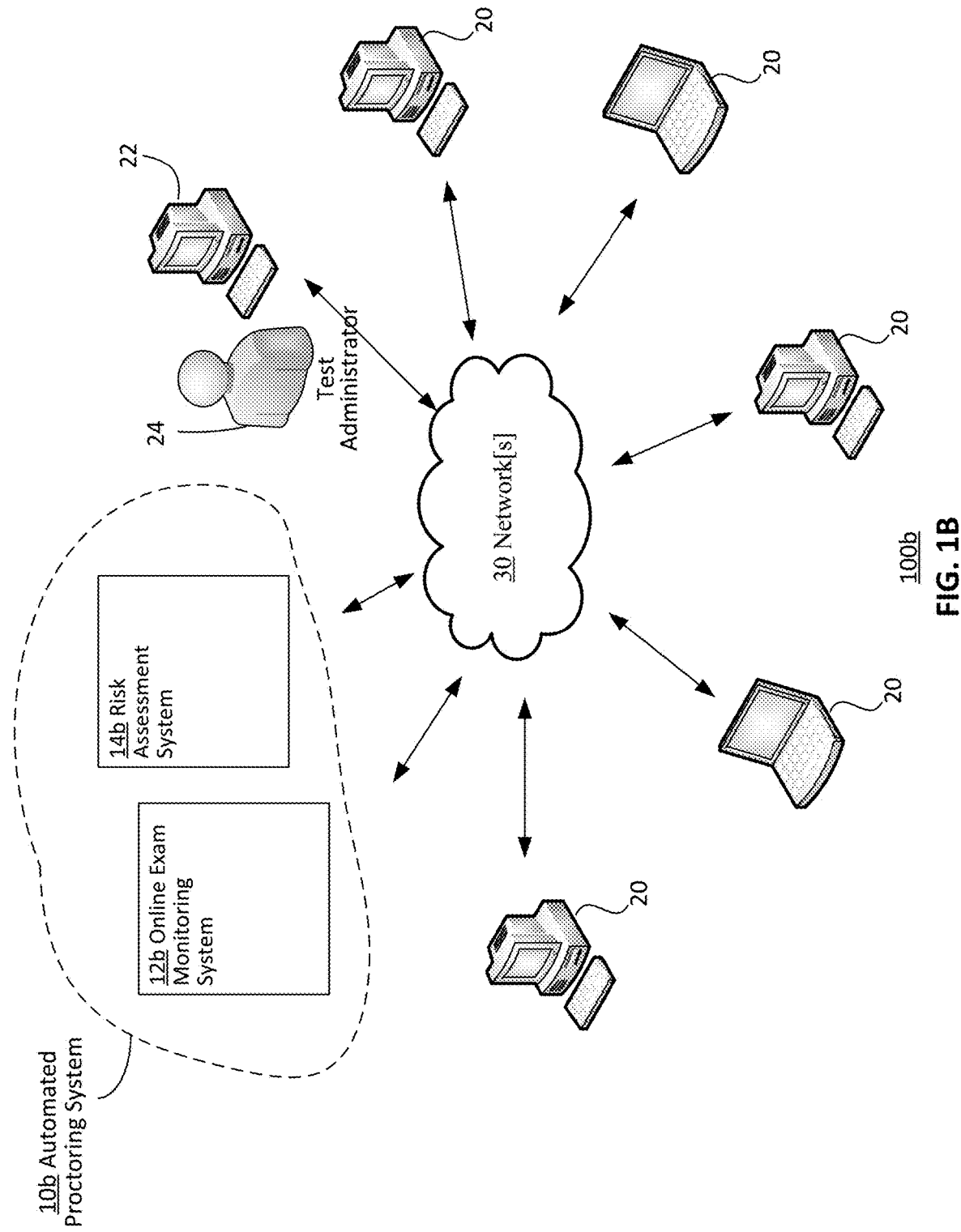

| | | | | | | |
|---|---|---|---|---|---|---|
| ⊘ 9 completed | 1 processing | 1 not attempted | | | | |
| ⊙ 2 high priority for review | 4 medium priority | 2 low priority | | | | |

| Last ⇅ | First ⇅ | Status ⇅ | Priority ⇅ | Date ⇅ | Score ⇅ | Duration |
|---|---|---|---|---|---|---|
| Adler | Jane | ✓ | HIGH | 29 Mar 2018 @ 12:43AM | 71.1 | 33:45 |
| Moamad | Angelina | ✓ | HIGH | 19 Mar 2018 @ 9:43AM | 94.0 | 10:55 |
| Possession | Dixon | ✓ | MED. | 19 Mar 2018 @ 8:34AM | 93.0 | 10:12 |
| Smithsonian | Sebastian | ✓ | MED. | 12 Mar 2018 @ 8:17AM | 71.0 | 12:30 |
| Lockheim | Helen | ✓ | MED.* | 9 Mar 2018 @ 10:41AM (Attempt 3) | 71.1* | 33:45 |
| Gisamund | Bari | ✓ | MED. | 8 Mar 2018 @ 7:33AM | 94.0 | 10:55 |
| Aguemar | Linda | ✓ | LOW | 10 Mar 2018 @ 9:03AM | 85.4 | 9:55 |

FIG. 3B

SYSTEMS AND METHODS FOR ASSESSING DATA COLLECTED BY AUTOMATED PROCTORING

CROSS REFERENCE TO RELATED APPLICATION(S)

This application claims priority to U.S. Provisional Patent Application Ser. No. 62/698,861, filed on Jul. 16, 2018, which is incorporated herein by reference in its entirety.

BACKGROUND

1. Technical Field

The present disclosure relates to proctoring of examinations, and more particularly, to systems and methods for processing and analyzing data produced by automated proctoring systems for online examinations.

2. Description of Related Art

Online testing technology is a rapidly growing field, particularly in education and corporate training. However, ensuring the integrity of online testing results poses significant challenges.

Many types of testing services are currently available offering a variety of services and products. For example, commercial testing centers (e.g., PROMETRIC, PEARSONVUE) and testing centers at educational institutions provide controlled environments that reduce the likelihood of exam violations (e.g., cheating). However, these environments are expensive and don't scale efficiently for high volume situations.

An alternative to commercial testing centers is online proctoring services that enable a remote proctor to watch a test taker (via a webcam) during an online exam session. Exam violations are dealt with in real-time or are noted by the proctor and provided to the test administrator afterward. Online proctoring services are less expensive than commercial testing centers, but they can still be expensive. They also suffer from high-volume, scalability issues since human proctors are still required.

In contrast to commercial testing centers, automated exam proctoring solutions use a webcam to record the test taker during the exam session. In some cases, the video recording is analyzed using facial detection algorithms and other methods, from which suspicious proctoring events (e.g., suspicious events that occurred during or proximate to a proctored exam session and that may or may not be related to a cheating incident) are flagged and reported to the test administrator. Automated exam proctoring systems are highly scalable because they can be implemented with minimal human participation.

There are presently at least two key challenges with conventional automated proctoring systems. First, as much as 90% of flagged proctoring events are false positives (e.g., proctoring events that are flagged even though the student isn't violating any exam criteria). For example, an automated proctoring system might flag a test taker as "missing" from the video frame for a specific period of time. In reality, the test taker may have inadvertently placed his/her hands over a portion of the face (e.g., chin, lips, nose, cheek) such that the facial detection software was unable to identify the person during that time. A second challenge for automated proctoring systems is that a majority of all exam sessions have one or more flagged proctoring events. These high detection rates for flagged proctoring events in automated exam proctoring stand in contrast to research showing that a well-implemented proctoring system (of any type) limits cheating to approximately one to five percent of all online exam sessions (this one to five percent range is affected by a host of factors, such as the importance of the exam, the penalty for getting caught, knowledge of whether other students are cheating successfully, and whether additional safeguards are in place to deter cheating).

Thus, test administrators using automated proctoring systems are tasked with determining which of the exam sessions contain "true positives" (i.e., events where an exam violation has actually occurred). This is complicated by the fact that even "true positive" events detected by an automated proctoring system aren't equal in terms of importance and severity. For example, if a young child comes alongside a parent (the test taker) for a few seconds during an online exam, the system might flag the segment as a violation of the exam criteria ("multiple persons"). This would be correct, but it's not as important to the test administrator as would be a violation in which the test taker left the computer for several minutes during the exam. Similarly, an exam session with one flagged event might have greater overall risk than an exam session with five flagged events. That's because the one event may be of greater severity or duration than the other five events combined. Thus, simple tallies of flagged events may fail to provide meaningful information when assessing the overall risk that exam violations have occurred.

To date, efforts to improve automated proctoring systems have centered on the algorithms that are used to more accurately identify suspicious proctoring events (i.e., to reduce the false positives, or to improve identification rates of true positives). Gains have been modest in this area in recent years. Furthermore, such efforts do not improve the test administrator's ability to compare (much less rank) exam sessions from an overall risk standpoint.

BRIEF DESCRIPTION OF THE DRAWINGS

FIG. 1B illustrates another example network environment.

FIG. 3B is an enlarged view of a portion of the example GUI of FIG. 3A.

DETAILED DESCRIPTION

Figure 1A:
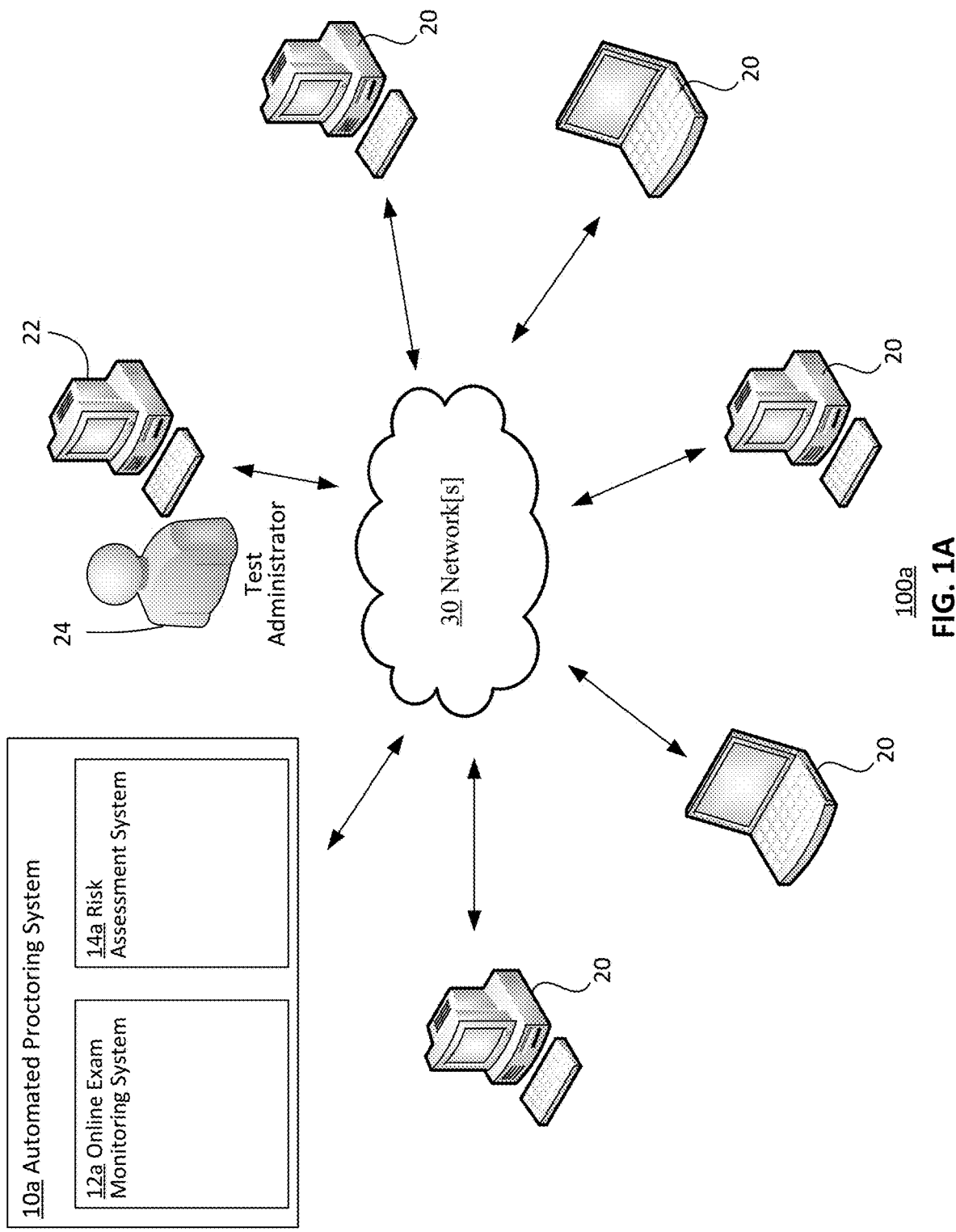
FIG. 1A illustrates an example network environment.

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known hardware, systems, and methods have not been described in detail to avoid unnecessarily obscuring the descriptions of the embodiments of the disclosure.

In the present disclosure, to the extent the terms "about" and "approximately," are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, the terms and variants of which are intended to be construed as non-limiting. The definitions in this paragraph are intended to apply throughout this disclosure unless otherwise expressly stated.

According to various embodiments of the present disclosure, systems and methods are disclosed herein for, among other things, processing and analyzing data collected in connection with online examinations taken by test takers, and to provide a risk assessment (which may be presented as a risk level ranking) which may be indicative about a likelihood that 1) the data is not of sufficient quality to provide usable information for assessing a proctoring event or series of proctoring events or 2) the data suggests a potential exam rule violation has occurred (e.g., cheating or other violation). For the embodiments, the data that is collected may be provided by various sources including, for example, webcams, computing devices, test takers' interactions with the exam instrument (e.g., the set of questions that make up an exam), and/or biometric authentication sources. In some embodiments, biometric and activity data of a test taker are compared to baseline data associated with the test taker and/or associated with aggregated data from other test takers who utilized the same exam instrument.

As a result, events (hereinafter "proctoring events") that violate testing criteria (e.g., criteria that test taker not leave the test taker's computing device during the exam session, criteria against having a third-party present and assisting the test taker, criteria against looking up information in a text book, criteria against attempting to access other applications on the computing device during the exam, etc.) may be flagged or identified, each of which may be assigned a point value based, at least in part, on the type of criteria that was violated and that may be further adjusted by weights, which may be derived in combination with other data. The points may then be tallied so an overall risk level can be presented to the test administrator, or other interested third-parties, which may convey a ranking (prioritization) as to whether a violation of testing criteria may have occurred during the exam session, or that the data itself is of insufficient quality to generate reliable results as will be further described herein.

The systems and methods according to the present disclosure may generate an overall score/value for an exam session that expresses the risk that 1) one or more meaningful exam violations have occurred during the exam session, or 2) that the webcam recording itself is of too poor quality to analyze it properly. This enables a test administrator to compare risk across a baseline of online exam sessions, as well as rank exam sessions within a group of test takers (e.g., a class). Thus, test administrators can direct their investigative efforts toward exam sessions where risk is highest, while spending less time on those where risk is lower.

The systems and methods of the present disclosure may help test administrators to identify the small percentage of test sessions where students have actually attempted to cheat—or to identify exam sessions where the video recording is of too poor quality to provide such a determination. This is accomplished, in part, by providing, for example, a single overall risk level regarding data from an exam session to indicate the priority with which exam session data associated with a test taker should be reviewed by the test administrator. As will be further described herein, the overall risk level that may be provided may be provided in various forms including in textual form (e.g., LOW, MEDIUM, HIGH), in graphical form such as graphical bars, as numerical values, as icons or symbols, or in other forms. In some embodiments, the systems and methods may identify exam sessions where the video recording is of too poor quality to provide such a determination. That is, when the quality of the video recording is low, any data obtained from such recording may be unreliable for determining whether, for example, the test taker committed an exam rule violation In various embodiments, the systems may be integrated into a fully-automated proctoring system such as RESPONDUS MONITOR™, or may supplement or run on top of existing online proctoring systems.

To appreciate various aspects and features of the risk assessment systems and methods of the present disclosure, the following glossary of terms are provided:

Automated exam proctoring—Technology that captures and analyzes data from an exam session so that a fair and consistent testing environment is maintained.

Event—Any occurrence, incident, milestone, or episode that occurs in connection with an exam session and that occurs during or proximate to the exam session. In some cases, an event may be a series of related activities or occurrences.

Exam criteria—The rules, criteria, and procedures established by the test administrator about what is required, permitted, or disallowed during an exam session. Also known as "exam protocol."

Exam instrument—The set of questions that make up an exam or assessment.

Exam session—A period immediately before, during, or immediately after which a test taker participates in an online exam.

Exam violation—An exam criteria that has been violated by the test taker.

False positive flagged event—An event identified by an automated proctoring system that incorrectly indicates that an exam violation has occurred.

Flagged proctoring event—An event identified by a proctor (or proctoring system) that may indicate an exam violation has occurred.

Online exam—An examination or assessment delivered over the internet

Overall score—the total score that was obtained by adding or tallying together all the weighted points, as well as non-weighted points, if there are any, for one or more flagged proctoring events of an exam session where the points assigned to each of the one or more flagged proctoring event may be based, for example, on the event type of flagged events, as well as, for example, the durations of the flagged proctoring events.

Overall risk level (or simply "risk value" or "risk level")—A composite, weighted value (e.g., Low, Medium, High), which may be based on the combined score (referred to as "overall score") of one or more weighted or non-weighted points associated with one or more flagged proctoring events that conveys to a test administrator or other parties the risk that a meaningful exam violation has occurred. In some cases, the overall risk level is based on flagged proctoring events and other data gathered during or proximate to an exam session. In some cases, the overall risk level is based on occurrence of one or more triggering events.

Proctor—A person who oversees a test taker during an exam session so that a fair and consistent testing environment is maintained.

Proctoring event—Any notable event or milestone that occurs during or proximate to an assessment session (e.g., an exam session), such as the start time for an assessment, when a test question is answered, or an exam violation.

Test administrator—The person (e.g., instructor) who creates or administers a test or assessment.

Test center—A facility that provides computing devices and proctoring services so that examinations can be conducted in a controlled environment.

Test taker—The person (e.g., student) taking a test or assessment.

Triggering event—An event that occurs during or proximate to an exam session that when detected as occurring ensures that the overall risk level achieves a certain level (e.g., Medium, High) even if the composite point value isn't sufficient to achieve that level.

True positive flagged event—An event identified by an automated proctoring system that correctly identifies when an exam violation has occurred.

Note that in the following the words "exam," "test,", "assessment" and their variations may be used interchangeably, and may therefore, be synonymous unless indicated otherwise through, for example, the context in which the word is being used.

Turning now to FIG. 1A, which illustrates an example network environment 100a in which risk assessment systems and methods may be implemented according to some embodiments. The network environment 100a includes an automated proctoring system 10a, which comprises an online exam monitoring system 12a and a risk assessment system 14a that executes the risk assessment methods, and a plurality of computing devices 20 that are linked to the automated proctoring system 10a via one or more networks 30 and that may be used by test takers to take online exams. In some embodiments, the online exam monitoring system 12a and the risk assessment system 14a may, in combination, perform the various operations and processes to be described herein. In various embodiments, the automated proctoring system 10a may further communicate with one or more computing devices 22 that may be used by, for example, a test administrator 24 for disseminating, managing, and monitoring (including reviewing monitoring information regarding) online exams.

The automated proctoring system 10a may be a fully automated system that collects (via the online exam monitoring system 12a) various data associated with an online exam session (herein simply "exam session") of a test taker and that may be collected during or proximate to the exam session, and to process and analyze (via the risk assessment system 14a) such data to provide risk assessment (e.g., how likely) as to whether an exam rule violation occurred during the exam session. The automated proctoring system 10a may then transmit to the computing device 22 of the test administrator 24 the results of the processing and analysis of the data performed by the risk assessment system 14a. In some embodiments, the automated proctoring system 10a may also facilitate creation, dissemination, and management of online tests/exams. The one or more networks 30 may include, for example, the Internet, intranets, extranets, wide area networks (WANs), local area networks (LANs), wired networks, wireless networks, or other suitable networks, or any combination of two or more such networks. As will be appreciated by those skilled in the art after reviewing the present disclosure, one or more aspects of the present disclosure may be implemented via one or more third partly learning systems.

The test takers' computing devices 20, as well as test administrator's computing device 22, may be any type of computing device such as a desktop computer, a laptop computer, a tablet computer, and so forth. Each of the computing devices 20 may include or may be coupled (i.e., communicatively coupled) to a webcam, a microphone, a keyboard, a mouse, a display, a speaker, and/or other user interfaces. In some embodiments the computing devices 20 may include or may be coupled to biometric sensors. In various embodiments, the computing devices 20 may provide to the automated proctoring system 10a, and more particularly to the online exam monitoring system 12a, various data (e.g., webcam recordings, the test takers' interactions with the assessment (e.g., the exam), and so forth) collected during an exam as will be further described herein. The online exam monitoring system 12a may also be designed to collect other types of data in addition to the data collected from the computing devices 20 such as data related to internet connectivity. The various data collected by the online exam monitoring system 12a may be provided to the risk assessment system 14a.

The risk assessment system 14a may process and analyze the data collected by the online exam monitoring system 12a in order to, among other things, provide one or more indications as to risk level[s] related to likelihood that one or more exam rule violations occurred during one or more exam sessions of one or more test takers. Note that for purposes of the following the phrase "exam session" relates to a specific instance of an online exam being taken by a test taker. In contrast, an "exam" is an online test that may be taken by one or more test takers at the same time or at different times. Note that although the online exam monitoring system 12a and the risk assessment system 14a are illustrated in FIG. 1A as being separate systems, in alternative embodiments, the risk assessment system 14a may be integrated with the online exam monitoring system 12a. A more detailed discussion related to the processes and analysis to be performed by the risk assessment system 14a will be provided in greater detail below.

In some embodiments, the automated proctoring system 10a may be implemented by a network device (e.g., a server, a workstation, and so forth). In other embodiments, however, the automated proctoring system 10a may be a cloud-based system (e.g., implemented by a plurality of network devices including, servers, workstations, data stores, etc.). In various embodiments, the risk assessment system 14a (as well as the online exam monitoring system 12a) may be implemented by programmable circuitry, such as one or more processor, executing computer readable programming instructions (i.e., software), or may be implemented by using dedicated circuitry such as application specific integrated circuit (ASIC), or combination of both. Note that although the embodiment illustrated in FIG. 1A shows the online exam monitoring system 12a and the risk assessment system 14a as being integrated into a fully automated proctoring system 10a, in other embodiments, the online exam monitoring system 12a and the risk assessment system 14a may be separate network systems as illustrated in FIG. 1B. In the embodiment illustrated in FIG. 1B, the online exam monitoring system 12b may be implemented by a single network device (e.g., a server, a workstation, or other types of network devices) or by multiple network devices (e.g., servers, workstations, datastores, etc.). Similarly, the risk assessment system 14b of FIG. 1B may be implemented by a single network device or by a plurality of network devices. The online exam monitoring system 12b and the risk assessment system 14b may be part of an overall automated proctoring system 10b. The online exam monitoring system 12b performs the same or similar functionalities as the online exam monitoring system 12a of FIG. 1A. Similarly, the risk assessment system 14b performs the same or similar functionalities as the risk assessment system 14a of FIG. 1A. Note that in the following description, "*" is a wildcard. Thus, references to a risk assessment system 14* may be in reference to the risk assessment system 14a of FIG. 1A or to the risk assessment system 14b of FIG. 1B.

Figure 1C:
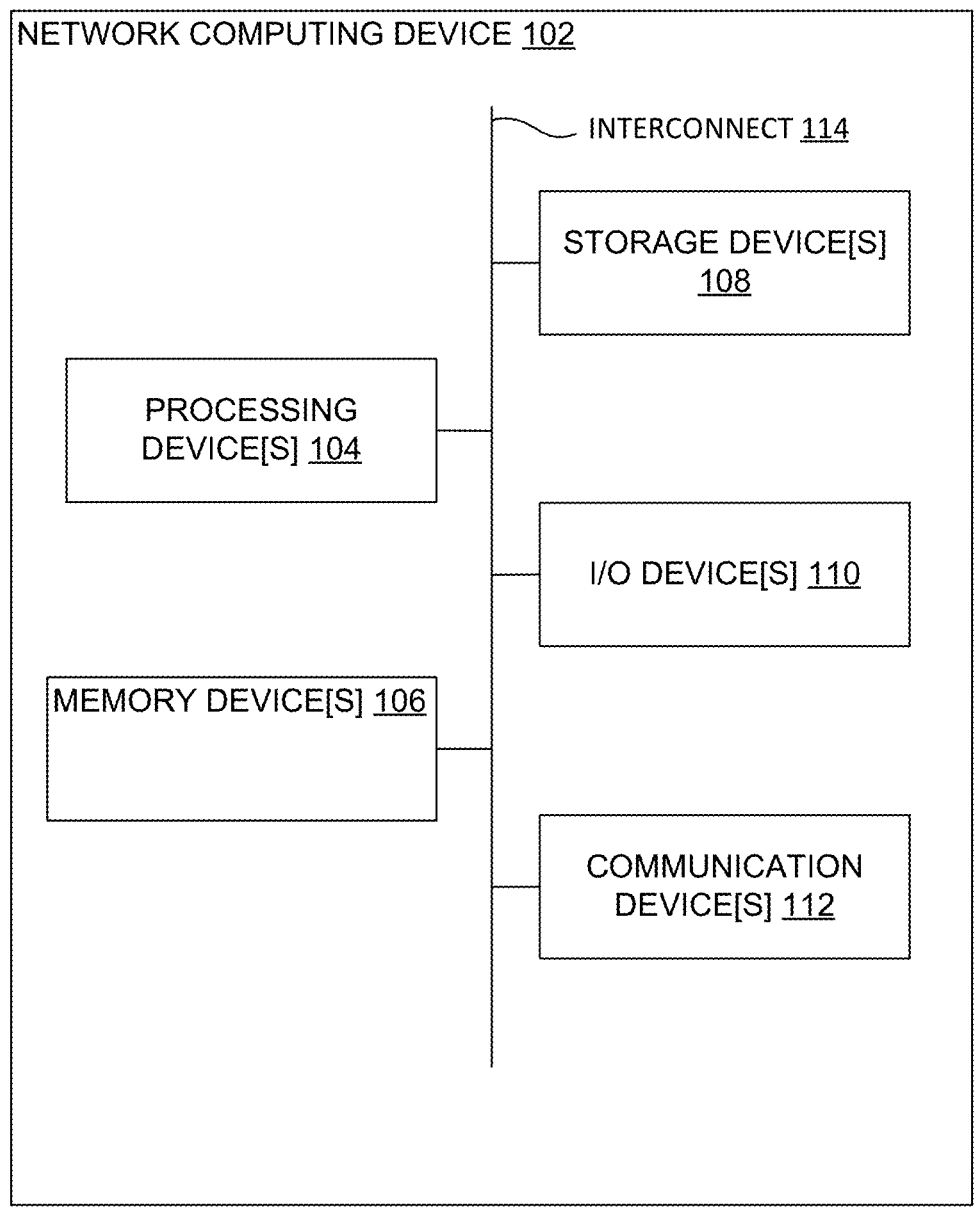
FIG. 1C is a high-level block diagram of an example network computing device according to some embodiments of the present disclosure.

FIG. 1C is a high-level block diagram of an example network computing device 102 according to various embodiments. For the embodiments, the network computing device 102 may implement the automated proctoring system 10a (including the online exam monitoring system 12a and the risk assessment system 14a) of FIG. 1A, or to implement the online exam monitoring system 12b or the risk assessment system 14b of FIG. 1B, As illustrated, the network computing device 102 includes one or more processing devices 104, one or more memory devices 106, one or more storage devices 108, one or more input/output (I/O) devices 110, and one or more communication devices 112, all coupled together via an interconnect 114. The processes and logic flows described herein can be performed by the one or more processing devices 104 executing one or more computer programs. For example, when the risk assessment system 14* is implemented at least partly via a computer program, the risk assessment system 14*, which may be loaded on the one or more memory devices 106, may be executed by the one or more processing devices 104 in order to execute the above-described techniques.

The interconnect 114 may be or include one or more conductive traces, buses, point-to-point connections, controllers, adapters, and/or other connection devices. The one or more processing devices 104 may include, for example, one or more processors, digital signal processors (DSPs), controllers, field programmable gate array (FPGA), application specific integrated circuit (ASIC), or the like, or any combination thereof. The one or more memory devices 106 may include one or more physical storage devices, which may be in the form of random access memory (RAM), read-only memory (ROM), flash memory, miniature hard disk drive, or other suitable type of storage device, or a combination of such devices. The one or more storage devices 108 may include one or more hard drives, digital versatile disks (DVDs), flash memories, or the like. Each of the memory devices 106 and/or storage devices 108 may store, individually or collectively, data and instructions that configure the one or more processing devices 104 to execute operations to implement the processes described herein.

The one or more communication devices 112 may include, for example, a network interface card (NIC), an Ethernet adapter, cable modem, Wi-Fi adapter, cellular transceiver, baseband processor, or the like, or a combination thereof. The one or more I/O devices 110 may include, for example, a display (which may be a touch screen display), audio speaker, keyboard, mouse, or other pointing device, microphone, camera, and so forth. Note that such I/O devices 110 may not be necessary if the computing system 2100 is a server computer.

Figure 2:
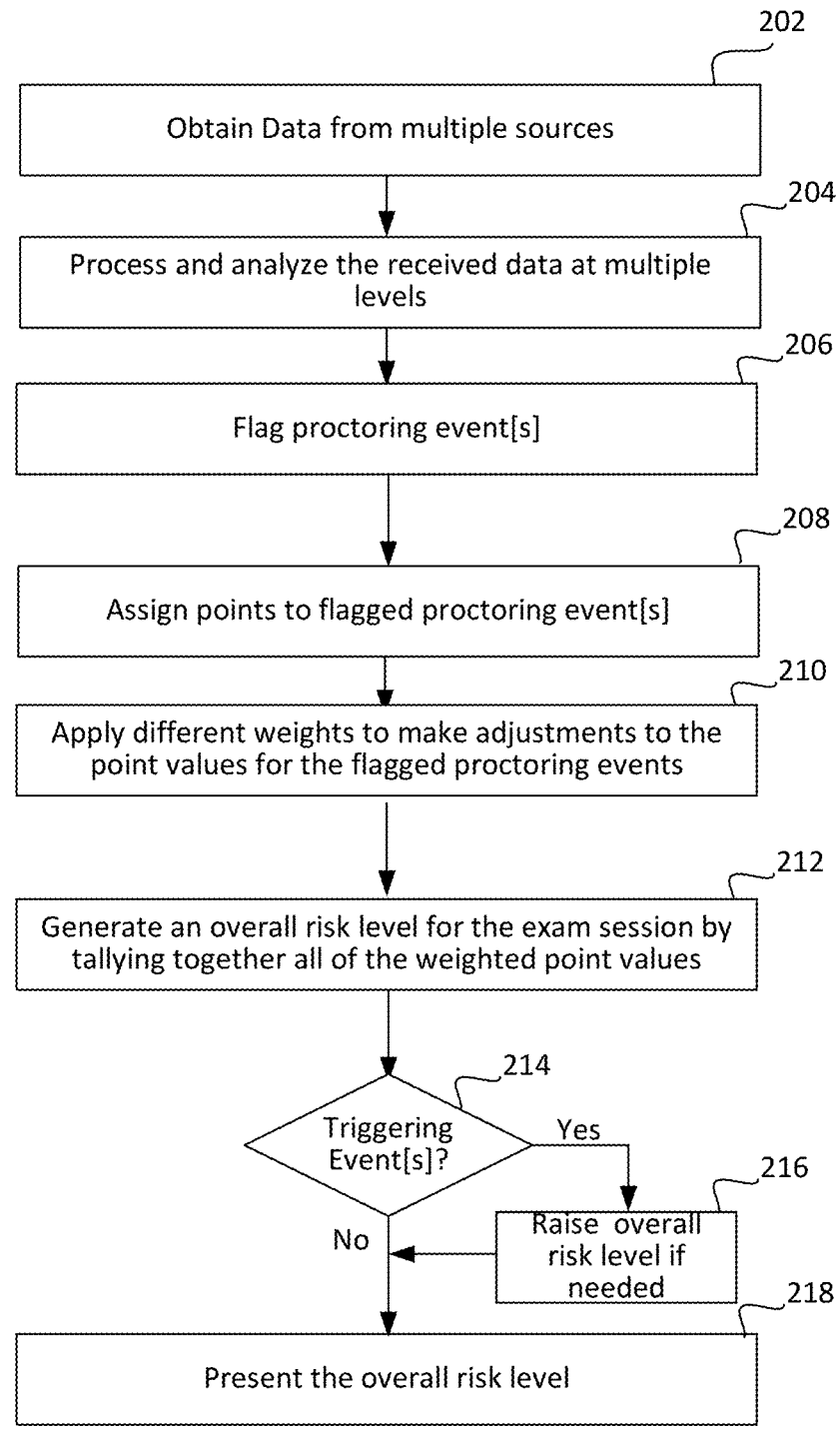
FIG. 2 is a high-level process for providing a risk level according to some embodiments of the present disclosure.

FIG. 2 illustrates a high-level process 200 for providing recommendation level for reviewing data of an exam session for exam rule violations and/or for indicating low data quality of exam session related data, as will be appreciated by those skilled in the art after reviewing this disclosure. For these embodiments, the recommendation level may be in the form of an indicator (e.g., textual, graphical, or iconic indicator) that indicates the likelihood that one or more examination violations occurred during an exam session. In some embodiments, the order of operations as presented is not intended to be limiting, and some steps in process 200 may be taken in a different order than presented herein, as will be appreciated by those skilled in the art after reviewing this disclosure. In some embodiments, process 200 may be implemented by the online exam monitoring system 12* and the risk assessment system 14* of FIG. 1A or 1B.

Process 200 may begin at 202 when data associated with an exam session of a test taker may be obtained from multiple sources by, for example, the risk assessment system 14* via the online exam monitoring system 12*. In some embodiments, the data may originate from at least three sources: 1) the test taker's computing device 20, as well as other test takers' computing devices 20 and one or more networks 30; 2) the test taker's interaction with the assessment (e.g., the exam being administered during the exam session); and 3) a webcam that recorded the test taker and his or her environment during the exam session. In some cases, at least some of the data may be obtained from one or more biometric authentication sources.

In various embodiments, the online exam monitoring system 12* may collect raw data from these sources including data indicative of one or more proctoring events. In some embodiments, the online exam monitoring system 12* may, upon obtaining the raw data, pre-process the raw data and flag proctoring events that appear suspicious and that may be connected to one or more cheating incidences. The processed data may then be provided to the risk assessment system 14*. Alternatively, the risk assessment system 14* may obtain from the online exam monitoring system 12 raw data collected from the multiple sources and process the data in order to flag the proctoring events that appear suspicious.

At 204, the obtained data, which may or may not have been pre-processed, may be processed and analyzed at multiple levels by, for example, the risk assessment system 14*. This may result in metrics being extracted from the obtained data. For example, in some embodiments, data from individual exam sessions of multiple test takers may be aggregated, and data from an individual exam session may then be compared to the aggregated data (hereinafter "aggregate baseline" data) to look for anomalies or patterns (further discussion regarding this step is provided infra). In the same or alternative embodiments, and as will be further described herein, a test taker's baseline may be established from the first few seconds to minutes, such as the first minute, of video recording of the exam session of the test taker that may be used to detect anomalies that may be flagged as potentially being related to suspicious activities.

At 206, one or more proctoring events that appear to be suspicious (e.g., deviate from the test taker's baseline or aggregate baseline) may be flagged by, for example, the risk assessment system 14*, as potentially being associated with one or more suspicious activities that occurred in connection with (e.g., occurred during or proximate to) the exam session. As will be further described herein, in some embodiments, the one or more proctoring events may be flagged based on the metrics extracted from the obtained data.

At 208, initial points may be assigned to the one or more flagged proctoring events by, for example, the risk assessment system 14*. The initial points that may be applied may, in some embodiments, be preset based on the type of proctoring event[s] that is or are being flagged. For example, certain types of flagged proctoring events (e.g., exam taker covering the webcam) may be assigned greater initial points than other types of flagged proctoring events (e.g., exam taker's face being absent or hidden from the webcam's view for a short period). Note in the following, the phrases "test taker" and "exam taker" are used interchangeably, and are therefore, synonymous unless indicated otherwise.

At 210 one or more weights may be applied to adjust the assigned point value or values of one or more of the flagged proctoring events by, for example, the risk assessment system 14*. In some embodiments, a weight may be applied to a point value of a flagged proctoring event by simply multiplying the point value with the weight. In other cases, other ways of applying the weight may be employed (e.g., dividing the point value by the weight, adding the weight, etc.).

In some cases the one or more weights that are applied may be based on the one or more flagged proctoring events themselves. For example, if a flagged proctoring event is the absence of the test taker from view of the webcam, and if the absence is an extended absence, than a greater weight may be applied to the assigned to the point value (in cases where the weight is applied by multiplying the weight with the original point value of the flagged proctoring event). In some cases, the one or more weights that are applied may be based, at least in part, on other events or data beyond the one or more flagged proctoring events themselves (e.g., duration of exam session, criteria selected by an administrator, such as, for example, whether notes and reading materials are permitted). Applying weights may comprise multiplying an assigned point value of a flagged proctoring event by a weighting value, dividing the assigned point value of the flagged proctoring event by the weighting value, adding the weighting value to the assigned point value of the flagged proctoring event, or other ways of applying weights.

For example, one way that a weight may be used is to apply the weight to a specific type of event or events. For instance, if textbooks and notes are permitted by the test administrator, the impact that MISSING events (e.g., events where the test taker is detected as being absent from the test taker's computing device) may have on the "natural" total point tally of an exam session may be reduced (since the natural total point tally may be over inflated because a test taker who is permitted to access textbooks and notes will more likely be missing from the webcam frame on multiple occasions during the exam session when the test taker consults his/her textbooks and notes). For example, if MISSING events alone result in 20 points, the point tally of the MISSING events may be reduced by X % when the test administrator permits the use of textbooks and notes (because it tends to generate a higher proportion of MISSING flags as test takers lean out of the video frame to read a textbook). Note, however, that in this example, the weight to be applied to other types of flagged events (e.g., MULTIPLE event where multiple people appear on a video frame, DIFFERENT event where a person different from the test taker appears in the video frame, etc.) may not be affected.

Another way that a weight may be applied is when all points for flagged events are tallied, the total tallied points is reduced by X points (or a percentage) for each 30 minutes of duration for the exam session. In this example scenario, the weight is applied after the overall score is tallied. For example, the overall score (e.g., total tallied points) may be reduced by 2 points for every 30 minutes of exam session duration—this may be done because the majority of events may be inadvertent (and false positives), such as a student covering their face with their hands for an extended period of time. An exam lasting two hours will have more of these events, but the rate these events occur is a better measure of risk; so the weight in this example adjusts for time. An exam session that has five events occur over 10 minutes would have higher risk than the same five events occurring over two hours.

Similarly, test takers using an iPad tend to have a greater number of events, simply because of the nature of the device and how it gets used. A weight helps to adjust the score (lower it) when an iPad is used because it generally has more false positive events.

At 212, an overall risk level for the exam session is determined for the test taker by, for example, the risk assessment system 14*. The overall risk level may be based on the overall score that was obtained by adding or tallying together all the weighted points, as well as non-weighted points, if there are any, for all of the flagged proctoring events of the exam session. In some embodiments, the overall risk level may be obtained from the overall score. The overall risk level may be provided in various forms including as a textual indicator (e.g., LOW, MEDIUM, or HIGH), as a graphical representation such as a graphical bar, as an icon or symbol, and so forth, that indicates the overall risk that exam violations occurred during an exam session. When provided to, for example, an exam administrator it informs the administrator as to what type of priority the administrator should give in reviewing (e.g., for purposes of ascertaining whether cheating occurred) proctoring data collected in connection with the exam session that is associated with the overall risk level. In some embodiments, the overall risk level may simply be the overall score obtained by adding together all of the weighted and non-weighted points.

At 214, a determination is made as to whether one or more triggering events have occurred by, for example, the risk assessment system 14*. In some embodiments, a triggering event may be any proctoring event (or a combination of proctoring events) that may or may not be a flagged proctoring event that when determined to have occurred results in the overall risk level of the test taker to be adjusted to a higher risk level (e.g., Medium or High) from a lower risk level (e.g., Low) if the original overall risk level was at the lower risk level. Note that for purposes of the following, references to a "trigger" (and its variations) may be in reference to a triggering event that when detected causes the overall risk level of an exam session to be adjusted upwards if needed. That is, trigger[s] may be used to ensure that the overall risk level for the exam session will not fall below a certain risk level (e.g., MEDIUM or HIGH), if the tallying together of weighted and unweighted points does not naturally result in at least the certain risk level that is predetermined based on the triggering event. Stated another way, triggers may be additionally used to ensure that certain proctoring events raise the overall risk level to a certain minimum risk level. For example, suppose an exam session had only one flagged proctoring event (e.g., test taker is MISSING), but it was 90 seconds long, the points assigned to that particular event might only result in an overall risk level of LOW. However, because of the severity of the triggering event, the overall risk level may be raised from LOW to MEDIUM. That is, in some cases, the severity of a triggering event, which may be a flagged proctoring event, such as an extended length of time of the flagged event, may cause the overall risk level to be raised from a lower risk level (e.g., LOW) to some higher risk level (e.g., MEDIUM or HIGH).

Referring back to FIG. 2, if at 214 it is determined that one or more triggering events did occur then the overall risk level for the exam session is raised if needed at 216. That is, when a triggering event is detected, the overall risk level may be adjusted in order to ensure that a minimum overall risk level is achieved. Thus, if the "natural" overall risk level is already HIGH, then the overall risk level will not be adjusted. However, if the natural overall risk level is LOW, then the overall risk level may be changed to a minimum of HIGH. If there was no triggering event then process 200 moves to 218 where the overall risk level, as well as accompanying data in some cases, may be presented to, for example, the test administrator and/or other third parties (via graphical user interface displays as further described below). Note that the presentation of the overall risk level, as well as accompanying data may be accomplished by transmitting such data to, for example, a test administrator's computing device 22. Note further that in some cases, flagged proctoring events may be placed on a timeline to enable the test administrator to view them graphically—or to identify/select a specific flagged proctoring event for further investigation.

In various embodiments, the overall risk level may be represented, in whole, or in part, by an icon or a word or phrase, and in some embodiments, the overall risk level is not displayed by a numerical value. For example, if the overall score reaches certain point levels within particular ranges, the overall risk level may be represented to the test administrator by wording, such as Low, Medium, or High, depending on the range in which the numerical risk level falls. Also, in some embodiments, a graphical display may indicate an overall risk level to a test administrator by a graphical bar, with the level of the graphical bar corresponding to a risk level, Low, Medium or High, and wherein the graphical bar may also include graphical representations through a range of length for each risk level, Low, Medium, or High (e.g., the graphical bar extends to a high end of Low risk range, or to a lower end of a High risk range, etc., simulating an analog display, as will be appreciated by those skilled in the art after reviewing this disclosure) as illustrated, for example, in FIGS. 3A and 3B.

Note that the methods, as well as the systems that implement the methods, disclosed herein are designed to monitor and analyze data indicating activities of multiple test takers during the same (or different) exam in order to ascertain risk levels as discussed above. A more detailed explanation of various aspects of process 200 will now be provided below.

With respect to the acquisition of data from multiple sources (see 202 of FIG. 2), the first data source that was described above includes the computing devices 20 of test takers and networks 30 (e.g., providing data related to internet connectivity). Among the types of data that may be acquired from these sources (e.g., test taker computing devices and networks) are:

- data that indicates type of device (computer, tablet, mobile) used by a test taker to take an online exam;
- data that indicates quality of internet connection (speed, latency, packet loss, etc.) during an exam session;
- data that indicates webcam disconnects and reconnects (quantity, duration of each, timestamp for each) during an exam session;
- data that indicates times when the keyboard/mouse/touch are in active use by a test taker during the exam session;
- data that indicates changes to a test taker's computing device hardware (e.g., connection/disconnection of a monitor; insertion of a flash drive, etc.);
- data that indicates changes to a test taker's computing device software (applications or processes that get blocked or shut down during an exam session); and
- data that indicates biometric authentication—identifies probability that a test taker is the same person who took an earlier assessment by that user. This may involve, for example, keystroke identity validation.

As discussed above, the second data source may be the test takers' interactions with the assessment (e.g., the online exam being administered). Among the types of data collected through this source are:

- data that indicates date/time that an exam session was started & completed (or terminated), time it takes to answer a question, and/or exam session duration;
- data that indicates time when each question was answered, or the answer was modified;
- data that indicates if/when a test taker tried to exit the exam session early; and
- data that indicates whether a test taker tried to access other applications during the exam session (e.g., switch away swipe, CTL+ESC, CTL+ALT+DEL, etc.).

As discussed above, the third data source may be a webcam that recorded the test taker and his or her environment during the exam session. Among the types of data collected through this source are:

- data that indicates the times during the exam session when facial detection of a test taker is successful (or conversely, when it's not successful);
- data that permits the ability to create a temporary "signature" of a test taker's face (i.e., facial recognition);
- data that indicates the lighting quality of video recording (back lighting, contrast ratios within video frame, etc.);
- data that indicates that a test taker is MISSING from video frame (when, and how long);
- data that indicates that MULTIPLE people appear in the video frame (when, and how long);
- data that indicates the presence of a person in the video frame who is DIFFERENT from the test taker who started the exam session (when, and how long);
- data that indicates percent of time that a test taker's face is looking at the screen of the computing device relative to a test taker baseline established during the first minute of video (FRONTAL detection rate) (This can involve, for example, measuring a baseline angle of a test taker's face relative to the test taker's webcam, and if the angle remains within a certain number of degrees, such as a preset range, of that baseline, then FRONTAL detection is treated as maintained by a system of the present disclosure; whereas, if the live angle measured is outside of that range, FRONTAL detection is treated as not being maintained);

data that indicates as to whether a webcam was covered during the exam session (when, and how long);

data that indicates changes to audio levels throughout an exam session; and data that includes measurement of overall motion of a test taker during exam session; measurement of overall motion of background environment.

In some embodiments, a parallel facial detection system may be provided that runs real-time on a client (e.g., the browser) used by the test taker. This system activation may be an optional setting (e.g., controlled by a test administrator/instructor) and can alert a test taker during an exam session that the test taker's webcam cannot detect their presence (e.g., the warning could occur, for example, between 30 to 60 seconds after any sufficient facial detection signal has been lost (or otherwise after absence of sufficient signal when expected by, for example, the online exam monitoring system 12*). In some embodiments, automatically, or upon response to a selection by a test taker, a video window will appear so that the test taker can make the necessary adjustment to themselves, their webcam, or other feature of their device, and a selectable indicia may appear so that the test taker may select the indicia to indicate they've solved the issue. Moreover, in some embodiments, timing data, such as time elapsed since such alert was indicated, can be transferred from the client to one of the storage and/or processing components of, for example, the online exam monitoring system 12*, to indicate when the warning occurred, and when the test taker solves the issue (i.e., indicates that the issue has been solved).

In process 200, data that is collected from various sources may be processed and analyzed (see 204 in FIG. 2). Note that in some embodiments, data collected from a test taker's computer device and the test taker's interaction with the assessment is sent to, for example, the risk assessment system 14* via the online exam monitoring system 12* of FIG. 1A or 1B upon completion of the exam session (or when an exam session is terminated by the test taker). With respect to recordings made through a webcam, the webcam recordings may go through a post-processing step from which a more useful form of data may be generated as performed by, for example, the online exam monitoring system 12* or the risk assessment system 14* of FIGS. 1A and 1B. Further, in various embodiments, the webcam exam session data may be analyzed at multiple levels:

Analysis of individual exam session (e.g., video interruptions; frame rate lowered, etc.)

Analysis that uses a baseline derived from all videos analyzed by, for example, the risk assessment system 14* (e.g., how long a test taker can be "MISSING" before it generates a flagged event.)

Analysis that compares the exam session of a test taker to aggregated data of other test takers who use the same exam instrument (i.e., the set of questions that make up an exam or assessment). This may entail: 1) aggregating the data for test takers of that exam instrument, 2) comparing the test taker's results to the aggregated data to identify patterns or anomalies. For example, if the average time spent on Question 3 was 35 seconds, but this test taker spent 4 minutes on Question 3, this anomaly might get noted (i.e., flagged) as an event and affect the overall risk level for the assessment. If the test taker spent only 5 seconds rather than the 35 seconds average time for Question 3, that could also be a cause for being flagged. Note that the aggregate data of other test takers discussed here as well as the baseline derived from all videos described above are the aggregate baseline data that was previously described.

Below are examples of proctoring events that may contribute to the point system for the disclosed systems and methods in accordance with some embodiments (note that some of these proctoring events and their relations with assigned point values, weighting and triggers may also be addressed below under the section, Assignment of Point Values, Weighting and Triggers):

When the video frame rate (i.e., frames per second) of a webcam recording had to be lowered during an exam session because of poor connectivity.

Each internet disconnection, weighted by the length of the disconnect.

Percent of time that "facial detection" was achieved during the exam session

Percent of time that "frontal detection rate" occurred during the exam session (i.e., percent of time the test taker is looking forward at screen).

Number of "MISSING" events in the video, each weighted by the length of time the test taker was missing from the frame.

Number of "DIFFERENT" events in the video, each weighted by the length of time the person in the frame appeared to be different from the original test taker.

Number of "MULTIPLE persons" events in the video, each weighted by the length of time that multiple people appeared in the frame.

Outlier events:
the amount of time (low/high) a test taker spent on a particular exam question (compared to the average time spent by other test takers);
the amount of overall time spent on the assessment (low/high), compared to the average time spent by other test takers.

Exam session synchronicity—whether two test takers progressed through the exam instrument at a time and pace suggesting they collaborated with one another.

Figure 6:
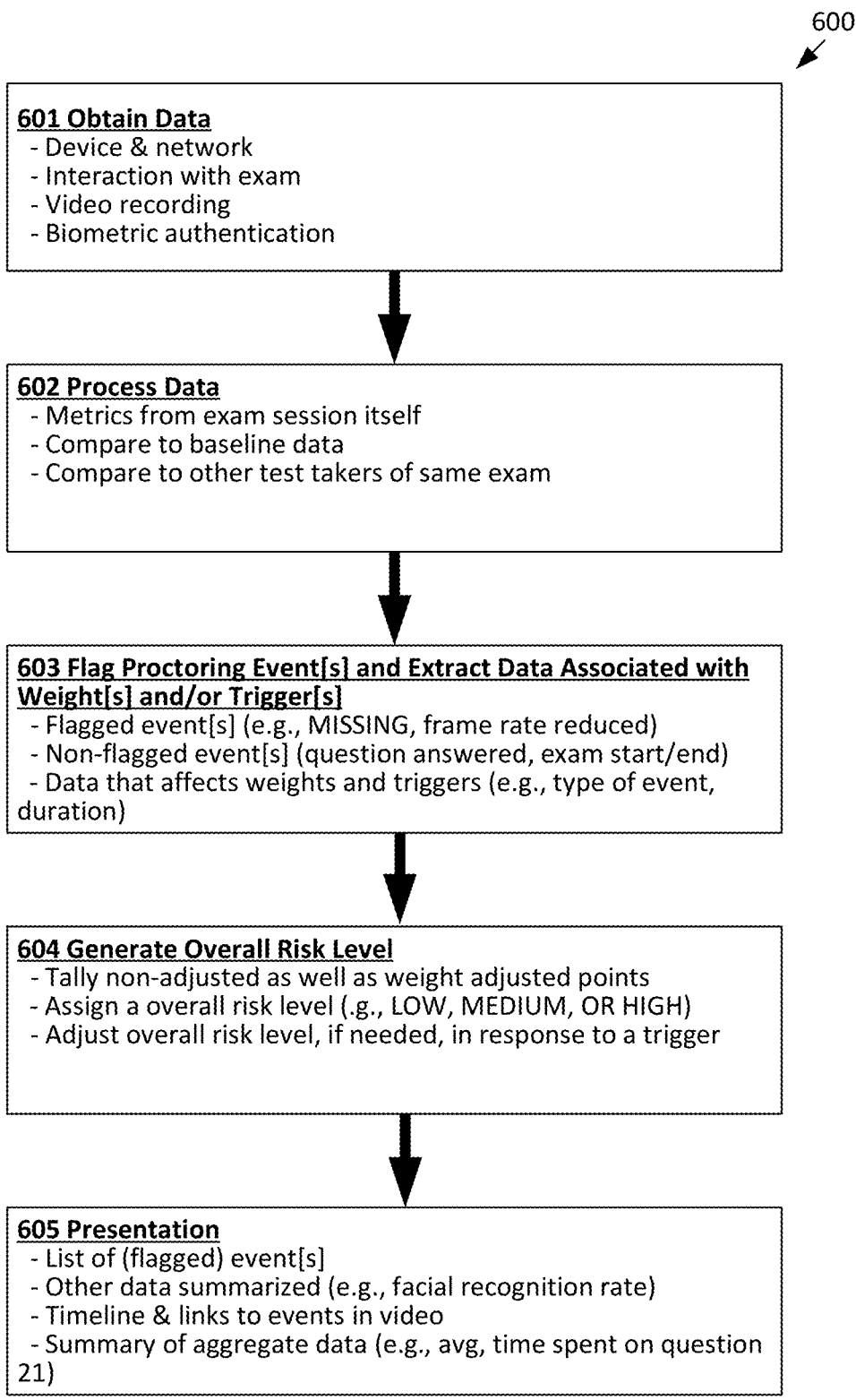
FIG. 6 is a high-level process for recommending review of exam session proctoring data, and for presenting the results of such assessment in accordance with some embodiments of the present disclosure.

FIG. 6 shows a process 600 for recommending review of exam session proctoring data, and for presenting the results of such assessment (recommendation) in accordance with some embodiments of the present disclosure. In various embodiments, process 600 may be performed for each test taker who took the same test/exam. Note that some of the process steps or features of process 600 overlap with the process steps or features described above for FIG. 2. Also, in some embodiments, the order of operations as presented is not intended to be limiting, and some steps in process 600 may be taken in a different order than presented herein, as will be appreciated by those skilled in the art after reviewing this disclosure. In operation 601 of FIG. 6, data may be obtained from multiple sources including, for example, a test taker computing device, as well as other test takers' computing devices and network[s], the test taker's, as well other test takers', interaction with the exam (i.e., assessment) that may be an online exam, video recordings from webcam[s], and/or biometric authentication[s](e.g., biometric sensors such as keystroke identity validation, fingerprint sensing and facial or ocular recognition systems).

In various embodiments, the obtained data may indicate a plurality of proctoring events (e.g., time when exam session began, length of time spent on each question, time when exam session ended, keyboard usage pattern, presence or absence of test taker's face from the test taker's computing device's webcam's field of view, as well as other events as previously described, and including various events described below in the section Assignment of Point Values, Weighting, and Triggering, etc.) that occurred in connection with the exam session (e.g., occurred during or proximate to the exam session) of the test taker. Note that operations 601 to 605 of FIG. 6 may each comprise of multiple operations as will be further described herein.

In operation 602, the obtained data may be processed and analyzed. For example, metrics from the exam session itself may be extracted from the obtained data including, for example, amount of time the test taker took on a particular exam question, time and length when the test taker's face was not detected, specific points in time when each question was answered, and so forth). As noted above, in some embodiments, a test taker baseline may be established from, for example, the first few seconds to minutes of video recording of the exam session of the test taker. In some embodiments, an aggregate baseline may be derived from videos of all exam sessions of all test takers that were collected and analyzed. In some cases, obtained exam session data of the test taker can be compared with the baseline data in order to flag one or more of the proctoring events in operation 603, in addition to other proctoring events that may be flagged in operation 603.

In operation 603, suspicious proctoring events may be flagged and data that affect weights and triggers may be extracted or identified. As noted above, flagged proctoring events are suspicious proctoring events that meet, for example, certain criteria (e.g., event type, minimum duration of the event, etc.). For example, without limitation, if the face of a test taker is not detected for 4 seconds, in some embodiments, a MISSING proctoring event will not be generated; however, if the face of the test taker is not detected for, say, 15 seconds (or some other time period such as 25 seconds), with no motion detected, such an event will be flagged as a MISSING proctoring event. In various embodiments, data that affects weights and triggers may include, without limitation, event type, event duration, number of event occurrences, how much the flagged proctoring event deviated from the baseline (e.g., average) of all of the other test takers or a baseline (e.g., average) for the test taker over an initial period of time, and so forth (as further set forth below under the section regarding Assignment of Point Values, Weighting and Triggers).

In operation 604, an overall score is determined for the test taker and an overall risk level may be generated based on the overall score. In various embodiments, the overall score for the test taker may be obtained by tallying together the assigned points of the flagged proctoring events, some of which may have been adjusted with the appropriate weights, to produce the overall score. Based on the overall score, an overall risk level for the exam session may be generated and presented to, for example, the test administrator in various forms including in the form of text (e.g., LOW RISK, MEDIUM RISK, HIGH RISK, and so forth as shown in FIGS. 3A and 3B), in the form of graphical representations such as a graphical bar (e.g., a graphical bar having sections that represents low risk, medium risk, or high risk, with variance/levels within each of the sections as shown in FIGS. 3A and 3B), in the form of an icon or symbol, in the form of a numerical value (which, in some cases, may be the same as the overall score) and/or in other forms for indicating the overall risk level.

Also, and as previously described, in some embodiments, the overall risk level for an exam session may be upgraded (e.g., going from a LOW overall risk level to a MEDIUM overall risk level) in response to occurrence of a triggering event. As discussed above for process 200, "triggers" may also be used to ensure one or more types of flagged proctoring event will raise the overall score/value to at least a certain overall risk level, if the tallying together of weighted and unweighted points does not naturally result in at least the certain overall risk level that has been predetermined based on the triggering event. Stated another way, triggers may be additionally used to ensure that certain proctoring events raise the overall risk level to a certain minimum risk level, as further illustrated below in the section regarding Assignment of Point Values, Weighting and Triggers.

In operation 605, the generated overall risk level of the test taker as well as other relevant data such as the overall risk levels of other test takers may be presented to a test administrator (See, e.g., FIGS. 3A, 3B, 4, 5A, and 5B) and/or to other parties/entities.

Figure 3A:
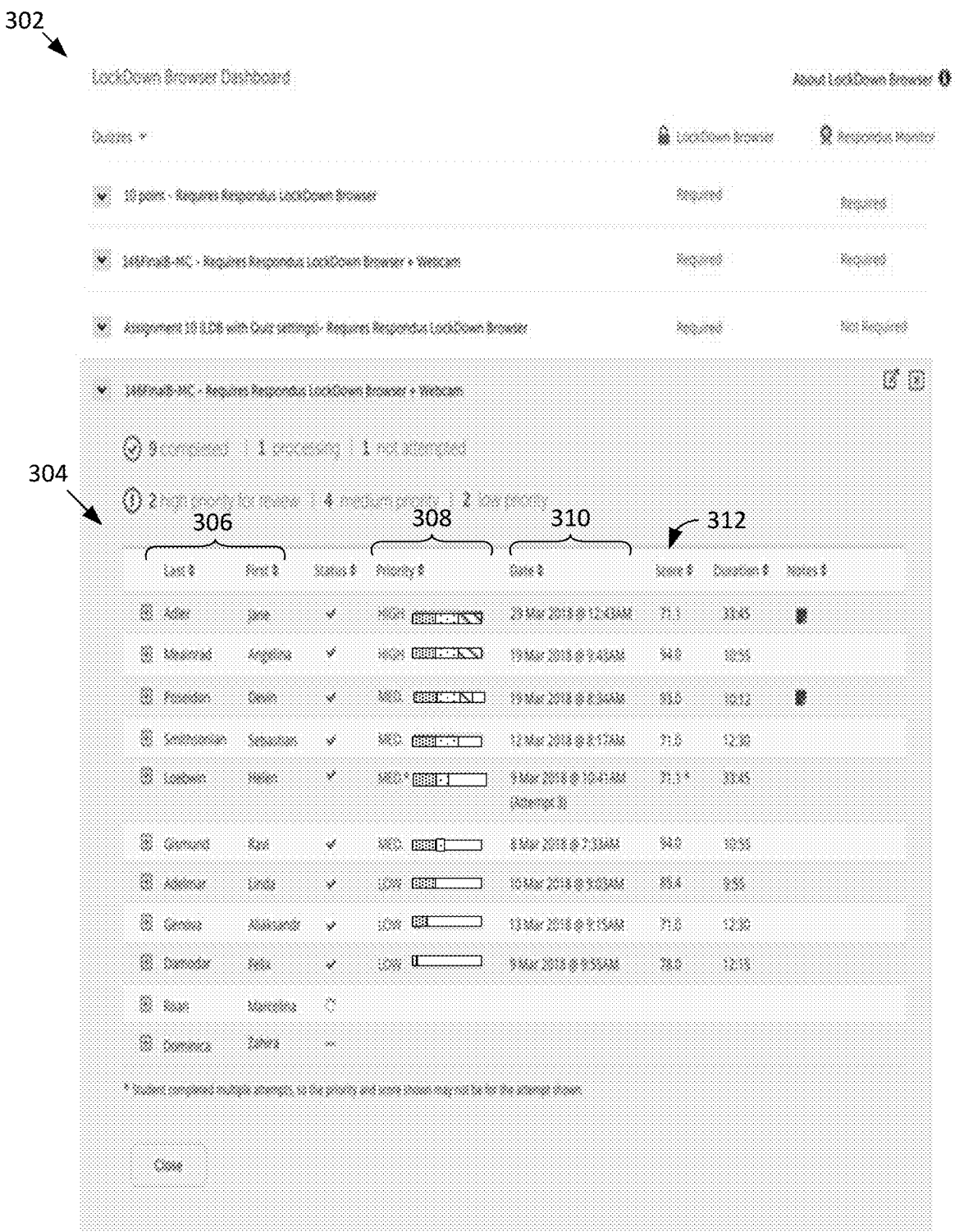
FIG. 3A is a screenshot of an example graphical user interface (GUI) according to an embodiment of the present disclosure.

FIG. 3A is a screen shot of an example graphical user interface (GUI) 302 that may be presented to, for example, a test administrator showing overall risk levels for each exam session of each test taker who, for example, took the same online exam. As illustrated, the GUI 302 includes a test takers list 304 that list at least some of the test takers who took the online exam. The identified test takers are listed according to their overall risk level, where test takers who have the highest overall risk levels are listed at the top (e.g., those with a HIGH overall risk level) of the list while test takers with the lowest overall risk levels are listed at the bottom (e.g., those with LOW risk level) of the list. FIG. 3B is an enlarged view of a portion of the GUI 302 of FIG. 3A. Column 306 provides names (i.e., Last and First names) of the test takers. Column 308 provides overall risk level for each test taker in textual form (e.g., LOW, MEDIUM, and HIGH) as well as in the form of graphical bars. Column 310 indicates data and time that each test taker completed their exam session. Column 312 indicates each test taker score (grade) for their exam session (e.g., A=90-100%, B=80-89%, etc.). Note that one or more elements of the example GUI 302 may be omitted in various alternative implementations. For example, in some implementations, column 312 may be omitted.

Note that in column 308, there are only three overall risk levels (i.e., HIGH, MEDIUM, and LOW) that each test taker can be assigned to. However, within each overall risk level, there could be different sublevels (e.g., high-MEDIUM, MEDIUM, low-MEDIUM, and so forth). This is demonstrated by the graphical bars on the right side of column 308 that graphically indicate the overall risk levels of each test taker. In this embodiment, each graphical bar can have up to three primary segments, a LOW segment 308a that represents LOW overall risk level, a MEDIUM segment 308b that represents MEDIUM overall risk level, and a HIGH segment 308c that represents HIGH overall risk level. Thus, if a test taker, such as the first test taker on the list, Jane Adler, has all three segments 308a, 308b, and 308c, that indicates that the test taker has a HIGH overall risk level. Note, however, that a test taker can have only a portion of a segment instead of a full segment. For example, although four test takers (Devin Poseidon, Sebastian Smithsonian, Helen Loebwin, and Ravi Gismund) in FIG. 3B all have MEDIUM risk levels, they are associated with different sub-levels of MEDIUM risk level as indicated by their associated graphical bar on the right side of column 308. For example, Devin Poseidon has a graphical bar 320a with a full MEDIUM segment 308b1 indicating that he is associated with a high MEDIUM risk level. In contrast, Ravi Gismund has a graphical bar 320b with a partial MEDIUM segment 308b2 indicated that he is associated with a low MEDIUM risk level.

Figure 4:
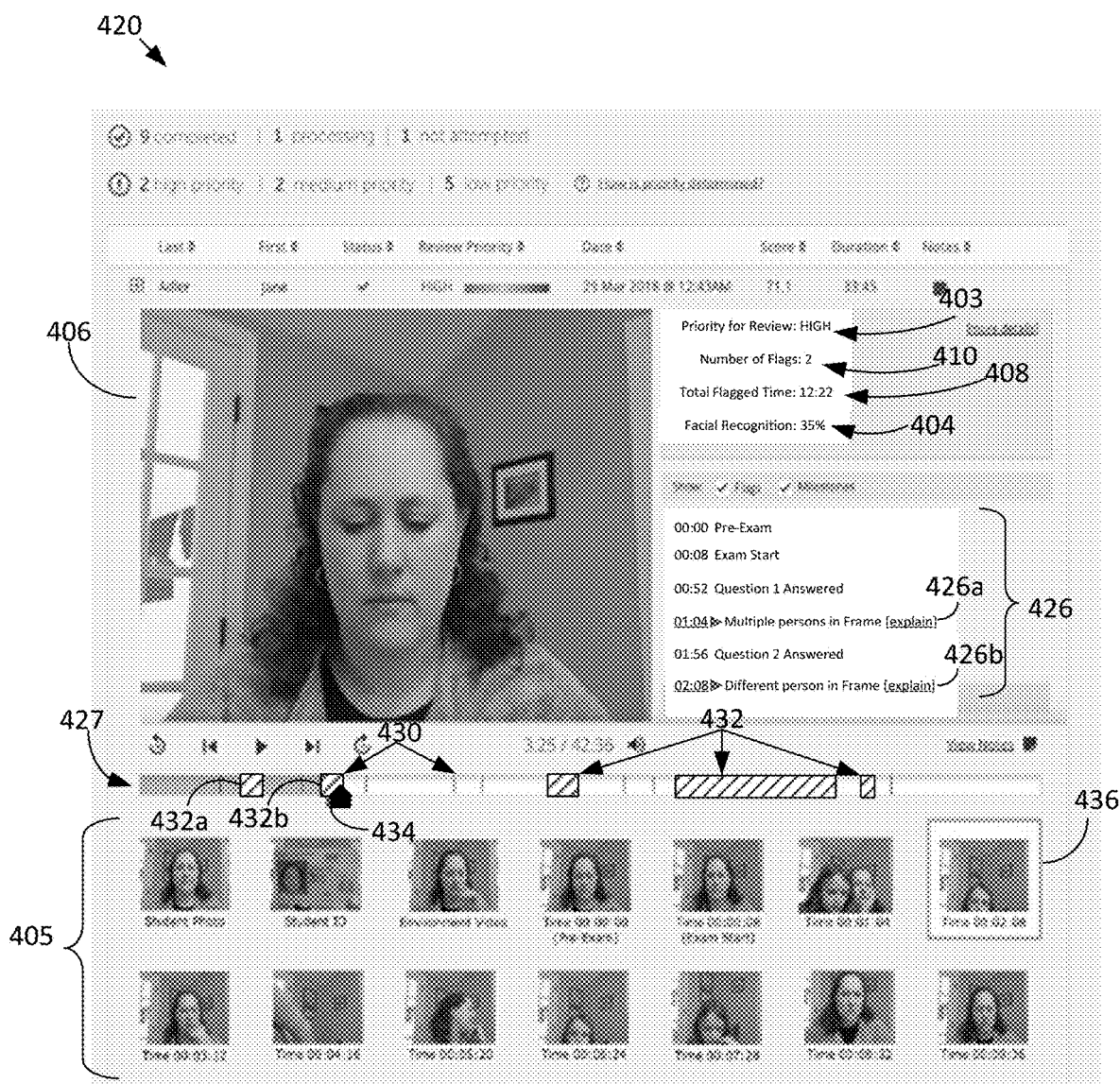
FIG. 4 is a screenshot of another example GUI that shows or that provides access to the overall risk level, as well as other relevant data/information, of an exam session of a test taker according to an embodiment of the present disclosure.

FIG. 4 is a screen shot of an example GUI 420 that shows or that provides access to the overall risk level, as well as other relevant data/information, of a test taker with respect to an exam session that the test taker took part in. In some embodiments, the GUI 420, which may be provided by an automated proctoring system 10*, may be presented to a test administer (or another party/entity) when, for example, the test administrator selects (e.g., clicks) the name of a test taker in the GUI 302 of FIG. 3A. As shown in FIG. 4, the relevant data that may be presented may include summary information including an overall risk level 403, a facial detection rate 404, total flagged time 408, number of flagged events 410, a thumbnail list 405 of exam session events/milestones (e.g., both flagged and non-flagged proctoring events) that may have occurred during or proximate to the exam session (each of the thumbnails may be a selectable link for displaying through a main screen 406 the video recording or a still shot associated with the corresponding event—note that an event can include an image of the test taker as well as their identification such as student or driver identification), an event list 426, and a timeline 427.

In various embodiments, the event list 426, the timeline 427, and the thumbnail list 705 may be functionally linked together as will be further described herein. That is, input provided by a user (e.g., via touchscreen or mouse) with respect to one of the event list 426, the timeline 427, and the thumbnail list 405 may cause what is displayed through the other ones of the event list 426, the timeline 427, and the thumbnail list 405. In various embodiments, the timeline 427 represents a timeline for the exam session that the test taker participated in where one end of the timeline 427, such as the far left side of the timeline 427, may represent the start of or just before the start of the exam session, and the other end of the timeline 427, such as the far right side, represents the end of or proximate to the end of the exam session. In some embodiments, the timeline 427 provides markers that indicates when various events/milestones occurred during or proximate to the exam session. For example, and as illustrated in FIG. 4, timeline 427 includes answer markers 430 (parallel vertical lines) that indicate when specific questions were answered. The timeline 427 may further include flagged segments 432 that indicate when corresponding flagged proctoring events occurred during or proximate to the exam session. There are five flagged segments 432 along the timeline 427 illustrated in FIG. 4.

In various embodiments, a user may move a current-time indicator 434 to the left or right along the timeline 427 in order to view, through the event list 426 and the thumbnail list 405, lists of specific events/milestones that occurred proximate to (e.g., that occurred just before, during, and/or just after) the point in time along the timeline 427 that the current-time indicator 434 "points" to. Note that in FIG. 4, current-time indicator 434 is located on top of a flagged segment 432b that represents occurrence of a flagged proctoring event along the timeline 427. In some embodiments, the event list 426 provides a list of events/milestones that occurred prior to or proximate to the point of time that the cursor 434 points to along the timeline 427. As illustrated, event list 426 includes two flagged proctoring events 426a and 426b. In this example, these two flagged proctoring events 426a and 426b corresponds to the two flagged segments 432a and 432b of timeline 427.

Similarly, thumbnail list 405 provides a thumbnail image/text list of events/milestones that occurred proximate to (e.g., shortly before, after, or during) the point of time where the cursor 434 point to along the timeline 427. Thumbnail list 405 may also include thumbnail images for time periods where no event/milestone has occurred, such as 60 second intervals of the exam session video recording. Note that because thumbnail 436 (which is a link to a video recording) corresponds to the flagged segment 432b of timeline 427 and the flagged proctoring event 426b of the event list 426, it is highlighted by a border. In various embodiments, if a user moves the current-time indicator 434 to the left or right along the time 427, the event list 426 and the thumbnail list 405 may be automatically updated to show an updated textual list of events/milestones (such as in the case of the event list 426) or an updated thumbnail list of events/milestones (such as in the case of the thumbnail list 405) that might be relevant to the point in time that the cursor 424 points to.

Similarly, if a user selects or "clicks" (via a touchscreen or mouse) on one of the other thumbnails of the thumbnail list 405 (other than thumbnail 436), the current-time indicator 434 may automatically move to the location of the timeline 427 where the event/milestone associated with the newly selected thumbnail occurred, and the event list 426 may also be accordingly updated to provide a textual list of events/milestones that occurred proximate to the occurrence of the event associated with the selected thumbnail. Likewise, if a user selects one of the events/milestones listed in the textual event list 426, the current-time indicator 434 may automatically move to a location on the timeline 427 that corresponds to the point or increment in time that corresponds to the selected event/milestone, and the thumbnail list 405 may be automatically updated to show thumbnails that may be relevant to the selected event/milestone (e.g., events/milestones that occurred proximate to the occurrence of the selected event/milestone).

Although not shown in FIG. 4, other relevant information may also be included in the GUI 420 including information that compares the data associated with the subject exam session of the test taker to data associated with other exam session of other test takers (e.g., comparing the overall score or overall risk level of the subject exam session with the overall scores or overall risk levels of the other exam session of other test takers).

Figure 5A:
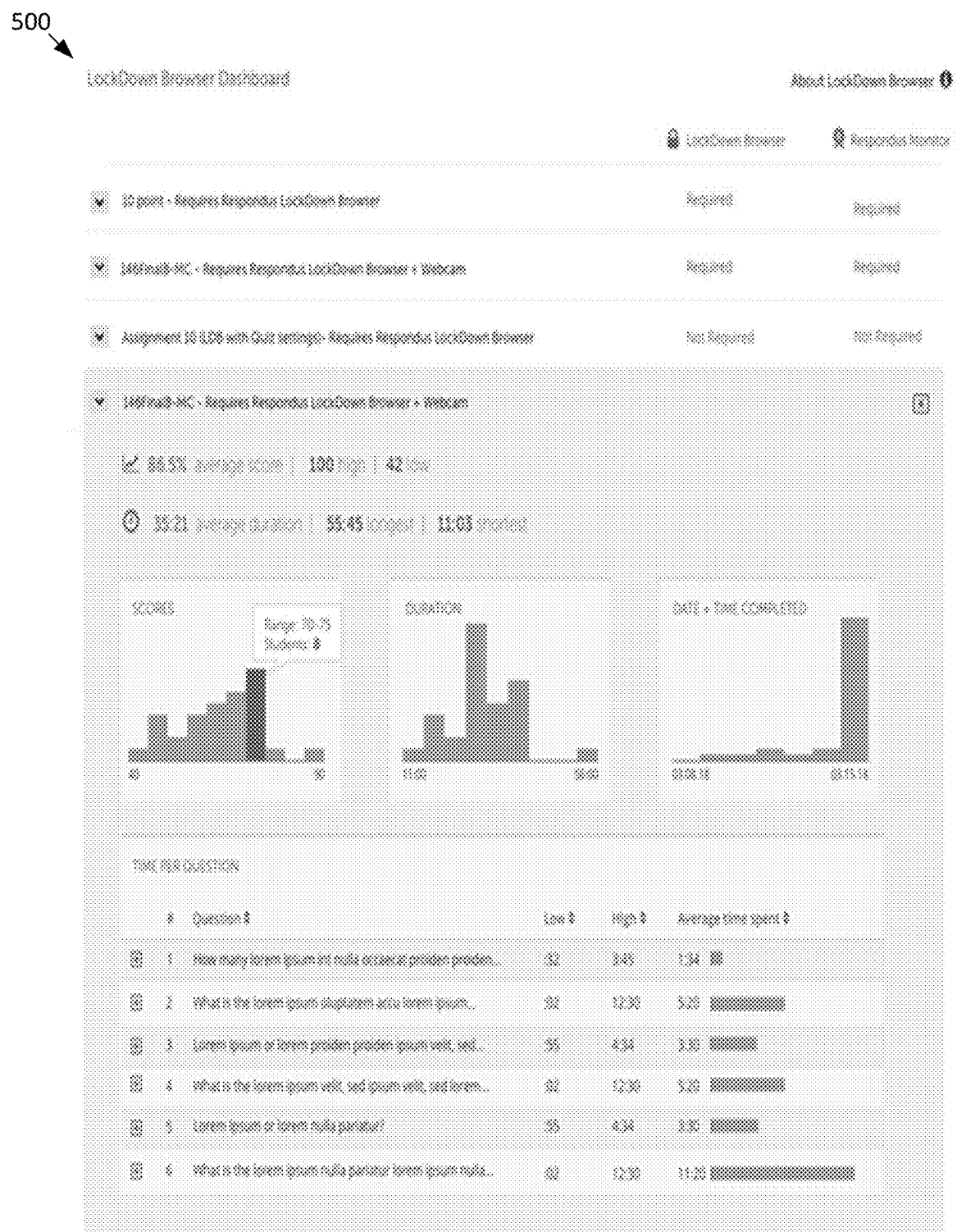
FIG. 5A is a screenshot of a GUI that shows summary of aggregate data as well as other relevant and non-relevant information according to an embodiment of the present disclosure.
Figure 5B:
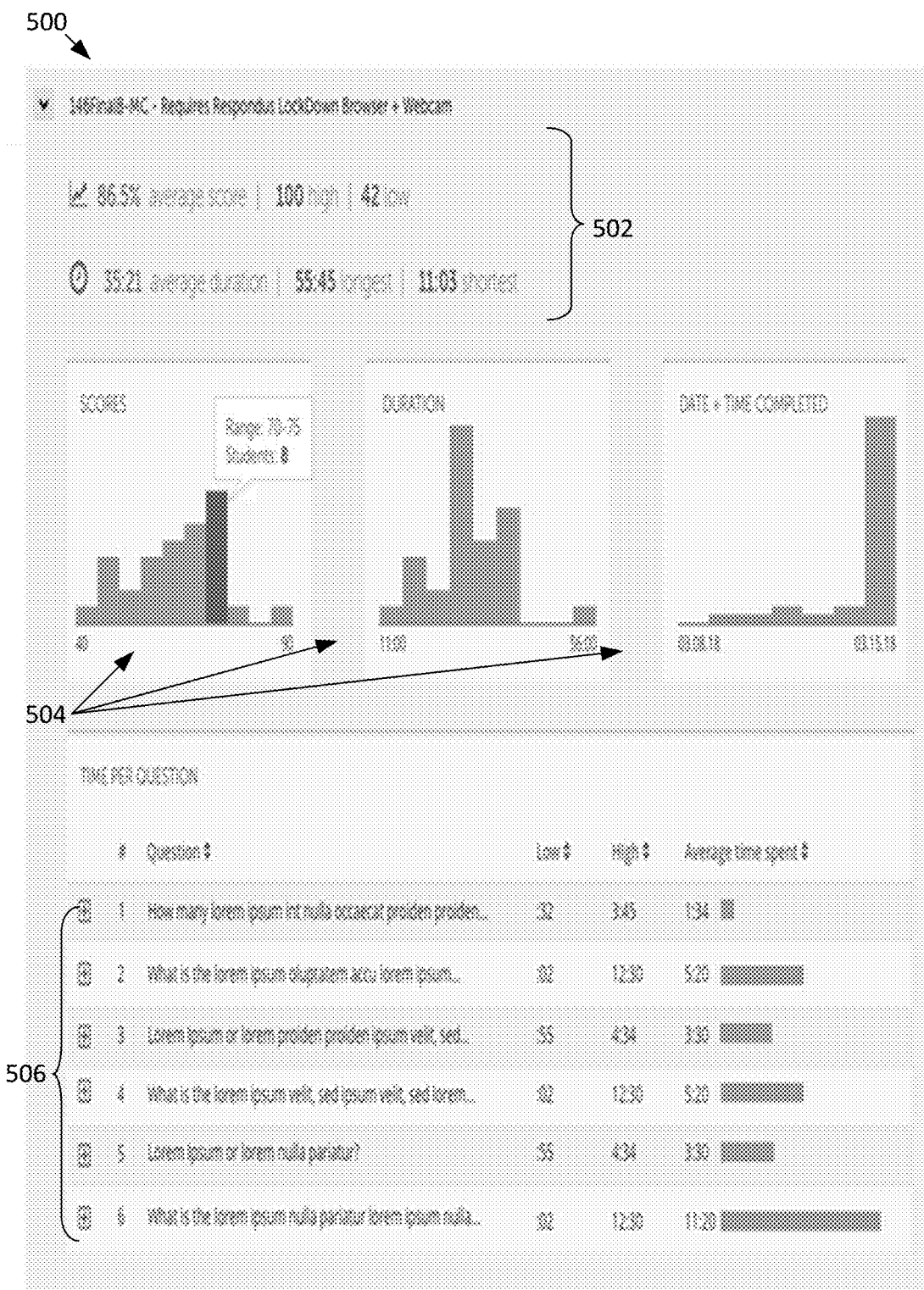
FIG. 5B is an enlarged view of a portion of the GUI illustrated in FIG. 5A.

Referring to FIG. 5A, which is a screen shot of an example GUI 500 that may be presented to a test administrator, or another party/entity, that shows summary of aggregate data (e.g., data collected from test takers who took the same exam) as well as other relevant and non-relevant information. FIG. 5B is an enlarged view of a portion of the GUI 500 of FIG. 5A. As illustrated, the GUI 500 includes summary information 502 of the aggregated data including average score for the test takers, the highest and lowest scores of test takers, average duration of exam sessions (e.g., average time that a test taker took to complete the exam), and the longest and shortest exam sessions of the test takers. The GUI 500 also includes bar graphs 504 showing the distributions of scores, exam session durations, and data and time that the exam sessions were completed. The GUI 500 further includes summarized information 506 related to the test takers' performances related to specific exam questions including the average amount of time spent on each question, and the highest and lowest amounts of time spent by test takers on each question.

In some embodiments, a test taker's "score" (i.e., "grade") for an exam, can cause a proctoring event to be flagged, or may be used as a weighting factor. For example, the pace that typical students progressed through an exam instrument can be assessed, and may be analyzed to determine that the average time for some questions is rather short, while the average time other questions is much longer. In some embodiments, the systems and methods as disclosed herein may identify a test taker who spends 1) equal time on nearly all questions, 2) spends significantly less time on the overall exam than most test takers, and/or 3) obtains a high score on the exam. This pattern might suggest a high-risk level (e.g., for example, the test taker might have obtained a copy of the test instrument, or answer key, prior to the exam session). If so, this may flag a proctoring event, or may be used to weight other flagged proctoring events, or may induce a trigger, in some embodiments.

As noted above, there are already several commercially available automated proctoring systems that are able to flag proctoring events that appear to be suspicious. However, the problem with respect to these systems is that they simply report back to, for example, the test administrator a list of flagged events (e.g., Adam's test had 3 flagged events which were X, Y and Z; Barb's had 4 flagged events which were W, X, Y, and Z, Craig's had 3, etc.). The test administrator (or someone else) is then tasked with reviewing each of these events, which can be very time-consuming.

The above problem is complicated by the fact that the raw number of flagged events isn't a good measure as to whether the overall exam session has a high/low level of risk for exam violation, nor does it account for poor video quality which can overstate certain types of events (e.g., MISSING) or prevent the use of certain types of analytics. Also, as stated above, an exam session with only one flagged event might actually have higher risk than an exam session with five flagged events. That is because the exam session with one flagged event might represent a more severe violation, or the duration of the violation might be longer. Further, one exam session might be 15 minutes in duration, while another is 150 minutes—longer exam sessions are more likely to have a greater number of flagged events, but that doesn't mean the overall risk that cheating occurred is greater with those exams. In order to address these issues, the disclosed systems and methods in various embodiments may consider these factors to determine what weights to apply to points assigned to various flagged proctoring events. For example, in the above case where exam session duration is substantially longer than other exam sessions, this may result in a reduced weighting value being applied for some flagged proctoring events.

Figure 7:
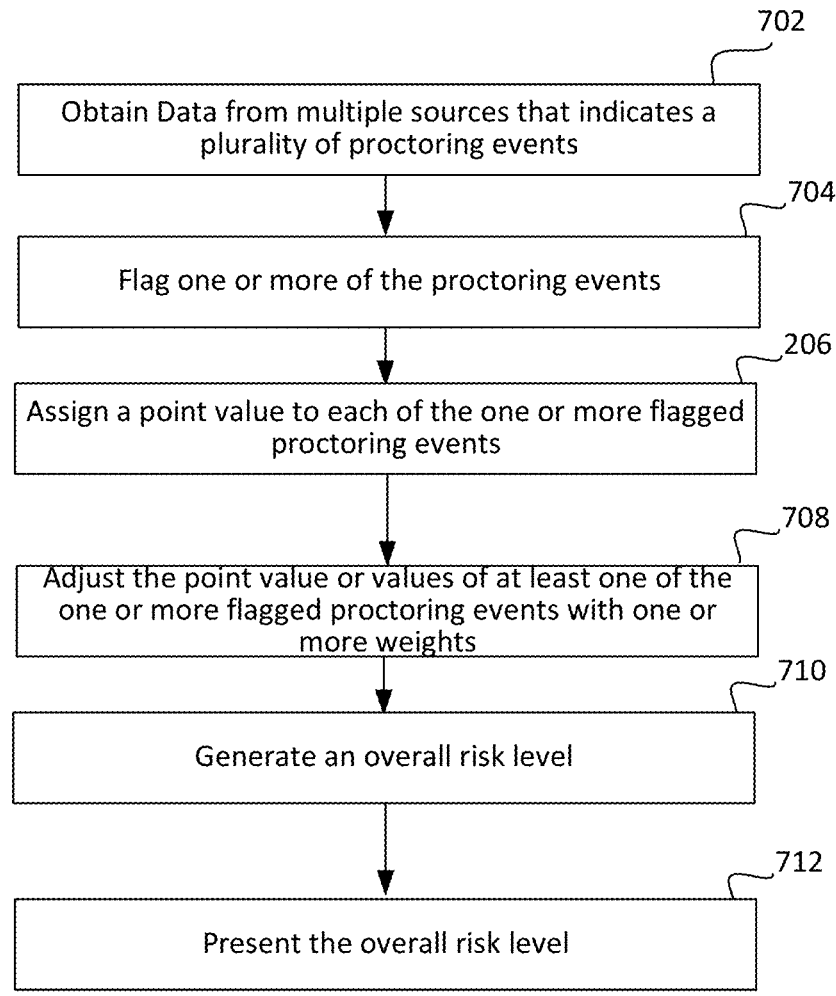
FIG. 7 is a high-level process for generating an overall risk level of an exam session of a test taker according to some embodiments of the present disclosure.

FIG. 7 is a high-level process 700 for generating an overall risk level of an exam session of a test taker according to various embodiments of the present disclosure. In some embodiments, the process 700 may be implemented by the online exam monitoring system 12* and the risk assessment system 14* of FIG. 1A or 1B. Process 700 may begin at 702 when data may be obtained, for example by the online exam monitoring system 12*, from multiple sources including one or more of the following: 1) the test taker's computer device as well as computer devices of other test takers and one or more networks; 2) the interaction of the test taker with the online exam (i.e., assessment); 3 video recording taken by the webcam of the test taker's computing device; and 4) biometric authentication sources. In various embodiments, the obtained data may indicate a plurality of proctoring events that occurred in connection with the exam session.

At 704, one or more of the proctoring events may be flagged (e.g., identified) as potentially associated with one or more exam violations by the test taker. The flagging of the one or more proctoring events, which may be performed by the risk assessment system 14*, may be based on a determination that the one or more proctoring events meet certain criteria (e.g., the absence of test taker's face from the field of view of the webcam, the usually long or short time that the test taker took to answer a particular question relative to other test takers, the test taker's angle of the face relative to the computer screen, detection of a third-party face in the field of view of the webcam, and so forth). In some embodiments, the one or more proctoring events may be flagged as a result of the one or more proctoring events deviating from one or more baselines (e.g., a test taker baseline that is developed from data collected during the first minute of the exam session or an aggregate baseline that is developed from data connected with exam sessions of other test takers)

At 706 each of the one or more flagged proctoring events may be assigned, by the risk assessment system 14*, a point value based, at least in part, on event type of each of the one or more flagged proctoring events. At 708 the point value or values of one, or some, of the one or more flagged proctoring events may be adjusted, by the risk assessment system 14*, with one or more weights, the one or more weights to be applied may be obtained based on data (e.g., duration of exam session, criteria selected by an administrator, such as, for example, whether notes and reading materials are permitted) other than data from the one or more flagged proctoring events. For example, in order to adjust the values of a first and second point values of a first and second flagged proctoring events, a first weight may be applied to the first point value to generate a first adjusted point value and a second weight may be applied to the second point value to generate a second adjusted point value. In some embodiments, a weight may be applied to the point tally of all the flagged proctoring events of an exam session. For example, the total tallied points of an exam session may be reduced by X points (or a percentage) for each 30 minutes of duration for the exam session. That is, the longer the duration of the exam session, the more likely that both true as well as false positive flagging events may occur during the exam session. As a result, the occurrence of any given flagging protracting event may be given less weight when determining the overall risk level (e.g., occurrence of three flagging protracting event during a one-hour exam session may be given greater weight than during a two-hour exam).

In some embodiments, the weight to be applied to a flagged proctoring event may be derived based on one or more proctoring events associated with the subject exam session other than the one or more flagged proctoring events of the subject exam session. In some embodiments, the weight to be applied to a flagged proctoring event may be derived based on duration of the flagged proctoring event, duration of the flagged proctoring event with respect to the length of the entire exam session, duration of the flagged proctoring event with respect to an aggregate baseline duration of proctoring events of other test takers that corresponds to the at least one of the one or more flagged proctoring event, or occurrence of one or more other flagged or unflagged proctoring events other than the flagged proctoring event.

At 710 an overall risk level for the exam session is generated based on an overall score obtained by tallying (i.e., adding) together the one or more adjusted point values, as well as one or more unadjusted point values if there are any, of the one or more flagged proctoring events of the exam session. In some embodiments, and as previously described, the overall risk level may be raised depending on whether one or more triggering events occurred (e.g., unusually long absence of the test taker from the field of view of the webcam, the presence of a third party in the vicinity of the test taker for an extended period of time, and so forth). In some embodiments, the overall risk level may be in the form of text such as LOW, MEDIUM, or HIGH, in the form of an icon or graphical representation, or in the form of a number such as the overall score that is the basis for the overall risk level.

At 712, the overall risk level may be presented along with, in some cases, other relevant data. In some embodiments, the overall risk level may be presented by electronically transmitting, via one or more networks, the overall risk level to one or more computing devices such as the computing device of the test administrator. Upon receiving overall risk level, as well as the other relevant data (e.g., aggregate data of test takers, comparison data, exam session metrics, and so forth), the one or more computing devices may display the overall risk level and the other relevant data.

Assignment of Point Values, Weighting and Triggers

In the following, an example point system is provided that defines the points to be assigned for specific events and the point requirements for different risk levels. For the embodiment, the ranges for the different risk levels may be as follows:

Review Priority Point System (e.g., Overall Risk Level)
    LOW=0-3.5 points
    MEDIUM=4-6.5 points
    HIGH=7+ points
    Note: The point system may be periodically adjusted as new events and weights are added to the algorithm. Note that in some embodiments, the point system, or the point tally, may not be displayed to users, but a graphical display may be displayed that shows variance within each category (e.g., one user might be in the upper range of LOW, while another user is in the lower range of LOW), as previously described.

| Facial detection rates (for entire video, range 0-100%) may be as follows: | |
|---|---|
| Over 75% | 0 points |
| 70-75% | 1 point |
| 50-70% | 3 points* |
| <50% | 4 points** |

*MEDIUM trigger (minimum)
**HIGH trigger (minimum)

For example, in some embodiments, at a facial detection rate of less than 50% of the duration of an exam session, the overall risk level must be indicated as HIGH and as such, if the total point tally of weighted and unweighted points is not at least 7+ points, then a triggering function will upgrade the risk level to HIGH for the exam session for the subject test taker. In some embodiments, if a trigger is responsible for raising risk level to a next risk ranking (or grouping), that ranking may be depicted at the low end of a range in the ranking (e.g., low end of a risk level in a graphical risk bar, such as those depicted in FIG. 3). Therefore, as will be appreciated by those skilled in art after reviewing this disclosure, a natural risk level ranking (e.g., a risk level ranking obtained through weighted or unweighted points without triggering), may result in a graphical depiction at a higher end portion of a graphical risk bar, than a risk ranking achieved through triggering.

| Frontal Detection Rate (for entire video, range 0-100%) | |
|---|---|
| Over 50% | 0 points |
| 30-50% | 1 point |
| <30% | 1.5 points |

Note 1: In some embodiments, the baseline may be established during the first minute of video; it measures the angle of the test taker's face relative to the webcam position. The frontal detection rate may then be calculated based on variance to that baseline for the remainder of the exam session.

Note 2: Frontal detection requires facial detection. Thus, the calculation is based only on the video segments when facial detection is actually achieved.

Note 3: In some embodiments, if the exam criteria allow students to access notes, books and other materials during the exam, this value is always 0 points (e.g., weight reduction in point value).

| MISSING (each event) | |
|---|---|
| 0-25 seconds w/ motion detected | 0 points |
| 0-15 seconds w/out motion detected | 0.5 point |
| 16-40 seconds | 1 point |
| 41-60 seconds | 1.5 points |
| 61-90 seconds | 2 points* |
| >90 seconds | 0.5 pts/30 seconds** |

*MEDIUM trigger (minimum)
**HIGH trigger (minimum)

Note that in some embodiments, the weighting given to a flagged proctoring event can be, for example, the duration of the event or a measured rate, as shown above and below in the point schedules for various events, and as may be applicable in various aspects of the present disclosure. However, another way to view the weighting based on the point schedule above, is as follows:

| MISSING = 1 point + weight adjustment | |
|---|---|
| Weight adjustment | |
| 0-25 seconds w/motion detected | multiply by 0 (1 × 0 = 0.0) |
| 0-15 seconds w/out motion detected | multiply by .5 (1 × .5 = 0.5) |
| 16-40 seconds | multiply by 1 (1 × 1 = 1.0) |
| 41-60 seconds | multiply by 1.5 (1 × 1.5 = 1.5) |
| 61-90 seconds | multiply by 2 (1 × 2 = 2.0)* |
| >90 seconds | multiply by ((duration/ 30 seconds) × 0.5)** |

Here, in this example immediately above, the flagged event is given 1 point, and the point schedule shown previously for the MISSING event is instead expressed as corresponding weights (or adjustments) applied to the 1 point.

| DIFFERENT (each event) (i.e., different faces detected) | |
|---|---|
| <6 seconds | 0 point |
| 6-16 seconds | 1.0 point |
| >16 seconds | 1.5 point |

| MULTIPLE (each event) (i.e., multiple faces detected) | |
|---|---|
| <20 seconds | 1 point |
| >20 seconds | 2 points |

| Video Interruption (each event) | |
|---|---|
| <30 seconds | 0.5 point |
| 30-60 seconds | 1 point |
| 60-120 seconds | 2 points |
| Over 120 seconds | 1 point per every 30 seconds |

Video frame rate lowered (one-time event) (i.e., counted as a YES or NO, and then point value assigned if YES)
  Yes=0.5 points
Exam Session Duration: Adjustment to final tally >61=(floor(duration/30)−1)*0.5

(e.g., IF the exam session is greater than 61 minutes, THEN divide the total time (duration) by 30, subtract 1, then multiply by 0.5. The examples that follow thus illustrate the weighting)
  E.g.,
    45-60 minutes, reduce by 0.5 point
    61-90 minutes, reduce by 1.0 point
    91-120 minutes, reduce by 1.5 points
    121-150 minutes, reduce by 2.0 points
    Etc.
    However, minimum "triggers" should be maintained
  Note: This uses the total time of the exam session, regardless of peer data.

Exam Session Duration: Relative to Peers
  In some embodiments, the risk assessment systems and methods described above may use standard deviations to identify exam sessions that are unusually long/short relative to peers who took the same exam. For these embodiments, a flag or warning related to such deviations may be generated and points may contribute to the Review Priority point system. The point value may be generated using a simple calculation (e.g., 1 point for 1 standard deviation, 2.0 points for 2 standard deviations, etc.)

Exam Question Duration: Relative to Peers
  In some embodiments, this analysis may focus on the length of time spent on individual questions, relative to peers. This might result in a flag that indicates an unusually long/short time spent on a question, relative to peers and points may contribute to the overall score for the exam session. Alternatively, this data may be used in combination with other data (e.g. MISSING) to increase validity of certain flags.

A second way this data may be used is to detect test takers who have progressed through the exam instrument in a suspiciously similar manner. This is referred to elsewhere in this description as "exam session synchronicity". A positive finding may generate a flag, and may provide additional information about the "other" student sessions involved, and may generate enough points to result in a HIGH risk level (or use a trigger to ensure this).

Video Quality Index
  In various embodiments, in addition to a first measure that indicates the overall risk discussed above, a second measure may be displayed that focuses solely on data quality or sufficiency (i.e., the quality of the video) so test administrators can understand how it contributed to the overall risk assessment score.

The greatest contributor to the video quality index is the facial detection percentage (lack of facial detection can impair analysis). Other contributors to the video quality index may include:
    Video interruptions (total time of video interruptions, adjusted for the overall length of the exam session).
    Frame rate lowered.
    Brightness/contrast measure.
    Background motion of the test taker's environment. (Note: high levels of background motion indicate that the computing device/webcam aren't on fixed surface—that is, it's been placed on a lap, bed, etc. Videos from fixed devices produce much higher quality of video, thus improving the analysis.).

Webcam Covered
  Test takers may sometimes cover their webcam (e.g., Post-It note) once the exam has started. The risk assessment system may detect this and generate a unique flag related to it (the term "unique" is used because such behavior already triggers low facial detection rates and MISSING flags, which raises the risk level to HIGH. But a separate flag displayed to a test administrator may be employed to distinguish this event from other events that cause low detection rates and MISSING flags). Distinct points and triggers can then be applied/used.

Changes to Computing Environment
  In some embodiments, the risk assessment system described herein may be integrated into a fully automated online proctoring system (e.g., RESPONDUS MONITOR™) and may run atop a specialized browser, such as RESPONDUS LOCKDOWN BROWSER™, that locks down online test environment and that prevents users from doing many things with their computing environment such as:
    Accessing other applications (e.g., screen capture, IM, etc.)
    Going to other URLs (e.g., preventing searches, etc.), or accessing other areas of the computing device
    Accessing applications that may launch automatically (e.g., applications launched with a timer, etc.).
    Making changes to the hardware environment (e.g. inserting a flash key, plugging in an external monitor after the exam starts).
    Attempts to switch away from the exam session (CTL+ALT+DLT; CTL+ESC; three-figure swipe, etc.)
  In some embodiments, the systems and methods described herein may be configured to flag certain events (e.g., task switching attempts; apps that launch with the use of timers, plugging in a thumb drive, etc.) because it indicates a test taker might be attempting to cheat.

Keystroke Biometric
  In some embodiments, keystroke pattern of test takers may be analyzed for identification purposes. The test taker may be required to type a phrase the first time the risk assessment system described herein is used for the test taker, which may generate a "signature" of the test taker's typing style. In subsequent uses, the risk assessment system described herein may generate a probability value indicating whether it's the same person or not. In some embodiments, a probability value below a certain range may trigger a flag and may contribute to the risk level point system.

Dark Skin: Adjustment to Final Tally
  For dark complexion persons, a racial detection feature may be provided so that a downward adjustment can be made to the final risk tally. This feature may be implemented when high contrast (e.g., white balance) issues are detected. Although significant improvements with respect to facial "recognition" have recently occurred, facial recognition improvements don't necessarily equate to facial "detection" improvements. For example, if there are significant white balance issues in the video, current systems may not be able to achieve the basic facial "detection" that is requisite for achieving facial recognition.

After reviewing the present disclosure, an individual of ordinary skill in the art will immediately appreciate that some details and features can be added, removed and/or changed without deviating from the spirit of the invention. Reference throughout this specification to "one embodiment," "an embodiment," "additional embodiment(s)" or "some embodiments," means that a particular feature, structure or characteristic described in connection with the embodiment(s) is included in at least one or some embodiment(s), but not necessarily all embodiments, such that the references do not necessarily refer to the same embodiment (s). Furthermore, the particular features, steps, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A computer implemented method, comprising:
   obtaining data from multiple sources including a webcam, the obtained data indicating a plurality of proctoring events that occurred in connection with an exam session of a test taker;
   flagging two or more of the proctoring events as potentially associated with one or more exam rule violations by the test taker;
   for each flagged proctoring event of the two or more flagged proctoring events:
      assigning a point value to the flagged proctoring event;
      determining a weight for the flagged proctoring event based on data other than the occurrence of the two or more flagged proctoring events; and
      adjusting the point value of the flagged proctoring event based on the determined weight;
   generating an overall risk level based on an overall score obtained by tallying together the adjusted point values for each of the flagged proctoring events to generate the overall risk level indicating likelihood of exam rule violation in connection with the exam session; and
   presenting the overall risk level.

2. The computer implemented method of claim 1, wherein obtaining data from multiple sources includes obtaining data from the test taker's computing device used to participate in the exam session.

3. The computer implemented method of claim 1, wherein obtaining data from multiple sources includes obtaining data from the test taker's interaction with an exam that is being administered during the exam session.

4. The computer implemented method of claim 1, wherein flagging the one or more of the proctoring events is by identifying one or more proctoring events that deviate from one or more baselines.

5. The computer implemented method of claim 4, wherein the one or more baselines includes a test taker baseline that is developed from data collected during a time increment at start of the exam session.

6. The computer implemented method of claim 4, wherein the one or more baselines includes an aggregate baseline that is developed from data connected with exam sessions of other test takers.

7. The computer implemented method of claim 1, wherein adjusting the point value or values of at least one of the one or more flagged proctoring events with one or more weights include adjusting a first point value of a first flagged proctoring event with a first weight and adjusting a second point value of a second flagged proctoring event with a second weight.

8. The computer implemented method of claim 1, wherein at least one of the one or more weights to be used to adjust point value of at least one of the one or more flagged proctoring events is derived based on one or more proctoring events associated with the exam session other than the one or more flagged proctoring events.

9. The computer implemented method of claim 1, wherein at least one of the one or more weights to be used to adjust at least one of the point values of at least one of the one or more flagged proctoring events is derived based on duration of the at least one of the one or more flagged proctoring events, duration of the at least one of the flagged proctoring events with respect to the length of the entire exam session, or duration of the at least one of the one or more flagged proctoring events with respect to an aggregate baseline duration of proctoring events of other test takers that corresponds to the at least one of the one or more flagged proctoring event.

10. The computer implemented method of claim 1, wherein the generated overall risk level is upgraded to higher overall risk level in response to a triggering event, and wherein the presenting of the overall risk level is by presenting the upgraded overall risk level.

11. The computer implemented method of claim 10, wherein the triggering event is based on a facial detection rate.

12. The computer implemented method of claim 10, wherein the triggering event is based on a lack of detection of facial features.

13. The computer implemented method of claim 1, wherein assigning a point value to the flagged proctoring event further comprises:
   determining a category of the flagged proctoring event; and
   assigning the point value to the flagged proctoring event based on the determined category of the flagged proctoring event.

14. The computer implemented method of claim 1, wherein presenting the overall risk level further comprises:
   generating a plurality of overall risk levels for a plurality of test takers, the plurality of overall risk levels including the generated overall risk level for the test taker;
   for each respective test taker of the plurality of test takers:
      rank the respective test taker based on an overall risk level associated with the test taker, the overall risk level associated with the test taker being included in the plurality of overall risk levels; and
   presenting at least a portion of the plurality of overall risk levels based on the ranking of each test taker of the plurality of test takers.

15. One or more non-transitory computer readable media having stored thereon instructions, that when executed by one or more processors of a computer system, cause the computer system at least to:
   flag two or more of a plurality of proctoring events indicated by data that was obtained in connection with an exam session of a test taker, the two or more flagged proctoring events being potentially associated with one or more exam rule violations by the test taker;

for each flagged proctoring event of the two or more flagged proctoring events:
  assign a point value to the flagged proctoring event;
  determine a weight for the flagged proctoring event based on data other than the occurrence of the two or more flagged proctoring events; and
  adjust the point value of the flagged proctoring event based on the determined weight; and
generate an overall risk level based on an overall score obtained by tallying together the adjusted point values for each of the flagged proctoring events to generate the overall risk level indicating likelihood of exam rule violation in connection with the exam session.

16. The non-transitory computer readable media of claim 15 having stored thereon instructions, that when executed by the one or more processors of the computer system further cause the computer system to present the overall risk level by electronically transmitting the overall risk level to a computing device via one or more networks.

17. The non-transitory computer readable media of claim 15, wherein the weight to be used to adjust point value of at least one of the one or more flagged proctoring events is derived based on one or more proctoring events associated with the exam session other than the one or more flagged proctoring events.

18. The non-transitory computer readable media of claim 15, wherein the weight to be used to adjust point value of at least one of the one or more flagged proctoring events is derived based on duration of the at least one of the one or more flagged proctoring events, duration of the at least one of the flagged proctoring events with respect to the length of the entire exam session, or duration of the at least one of the one or more flagged proctoring events with respect to an aggregate baseline duration of proctoring events of other test takers that corresponds to the at least one of the one or more flagged proctoring events.

19. The non-transitory computer readable media of claim 15, wherein the generated overall risk level is upgraded to higher overall risk level in response to a triggering event, and wherein the presenting of the overall risk level is by presenting the upgraded overall risk level.

20. The non-transitory computer readable media of claim 19, wherein the triggering event is based on a facial detection rate.

21. The non-transitory computer readable media claim 19, wherein the triggering event is based on a lack of detection of facial features.

22. A computing device, comprising:
one or more processors; and
memory containing instructions that, when executed by the one or more processors, cause the computing device to:
  obtain data from multiple sources including a webcam, the obtained data indicating a plurality of proctoring events that occurred in connection with an exam session of a test taker;
  flag two or more of the proctoring events as potentially associated with one or more exam rule violations by the test taker;
  for each flagged proctoring event of the two or more flagged proctoring events:
    assign a point value to the flagged proctoring event;
    determine a weight for the flagged proctoring event based on data other than the occurrence of the two or more flagged proctoring events; and
    adjust the point value of the flagged proctoring event based on the determined weight;
  generate an overall risk level based on an overall score obtained by tallying together the adjusted point values to generate the overall risk level indicating likelihood of exam rule violation in connection with the exam session; and
  present the overall risk level.

* * * * *